(12) United States Patent
Ito

(10) Patent No.: US 11,389,917 B2
(45) Date of Patent: Jul. 19, 2022

(54) ELECTRIC WORKING MACHINE

(71) Applicant: MAKITA CORPORATION, Anjo (JP)

(72) Inventor: Ryosuke Ito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 195 days.

(21) Appl. No.: 16/930,585

(22) Filed: Jul. 16, 2020

(65) Prior Publication Data
US 2021/0016406 A1    Jan. 21, 2021

(30) Foreign Application Priority Data
Jul. 18, 2019    (JP) .............................. JP2019-132857

(51) Int. Cl.
*B23Q 11/00* (2006.01)
*F16P 3/00* (2006.01)
*A01G 3/053* (2006.01)

(52) U.S. Cl.
CPC .......... *B23Q 11/0082* (2013.01); *A01G 3/053* (2013.01); *B23Q 11/0092* (2013.01); *F16P 3/00* (2013.01)

(58) Field of Classification Search
CPC ............ B23Q 11/0082; B23Q 11/0092; A01G 3/053; F16P 3/00
See application file for complete search history.

(56) References Cited

U.S. PATENT DOCUMENTS

| | | | | |
|---|---|---|---|---|
| 10,046,429 | B2* | 8/2018 | Stock ......................... | B25F 5/00 |
| 2010/0180740 | A1* | 7/2010 | Krapf ................. | B23Q 11/0082 |
| | | | | 83/72 |
| 2010/0218966 | A1* | 9/2010 | Liebhard ................ | A01G 3/053 |
| | | | | 318/722 |
| 2012/0017558 | A1* | 1/2012 | Pellenc .................... | A01G 3/04 |
| | | | | 56/233 |
| 2014/0094955 | A1* | 4/2014 | Ramaswamy ....... | G05B 19/406 |
| | | | | 700/177 |
| 2014/0116737 | A1* | 5/2014 | Iwata ........................ | B25F 5/02 |
| | | | | 173/20 |
| 2016/0021819 | A1* | 1/2016 | Nakano ..................... | B25F 5/02 |
| | | | | 30/276 |
| 2016/0249529 | A1* | 9/2016 | Ma ..................... | A01D 34/4163 |
| | | | | 30/276 |

(Continued)

FOREIGN PATENT DOCUMENTS

JP    2017-112953 A    6/2017

*Primary Examiner* — Omar Flores Sanchez
(74) *Attorney, Agent, or Firm* — Sughrue Mion, PLLC

(57) ABSTRACT

An electric working machine may include a support rod extending in a front-rear direction; a head unit attached to a front end of the support rod and including a front tool and a motor configured to drive the front tool; and a grip unit attached to a rear end of the support rod. The grip unit may include a grip housing configured to be gripped by an operator; a detection sensor attached to the grip housing and configured to detect an on/off operation for the motor by the operator; and a presence sensor attached to the grip housing and configured to detect a grip by the operator on the grip housing. The support rod may not penetrate through the grip housing. In a rear plan view of the electric working machine, at least one of the detection sensor and the presence sensor at least partially may overlap the support rod.

4 Claims, 18 Drawing Sheets

(56) References Cited

U.S. PATENT DOCUMENTS

| | | | |
|---|---|---|---|
| 2017/0144206 A1* | 5/2017 | Felder | B23Q 3/15722 |
| 2019/0280639 A1* | 9/2019 | Trinkle | A01G 3/086 |
| 2021/0015034 A1* | 1/2021 | Ito | A01G 3/086 |
| 2021/0124335 A1* | 4/2021 | Foerstner | A01D 46/253 |
| 2021/0252688 A1* | 8/2021 | Nyberg | A01G 3/062 |

* cited by examiner

ELECTRIC WORKING MACHINE

CROSS-REFERENCE TO RELATED APPLICATION

This application claims priority to Japanese Patent Application No. 2019-132857 filed on Jul. 18, 2019, the entire contents of which are hereby incorporated by reference into the present application.

TECHNICAL FIELD

This disclosure herewith relates to an electric working machine.

BACKGROUND

Japanese Patent Application Publication No. 2017-112953 describes an electric working machine. The electric working machine comprises a support rod, a head unit, and a grip unit. The support rod extends in a front-rear direction. The head unit comprises a front tool and a motor configured to drive the front tool. The head unit is attached to a front end of the support rod. The grip unit is attached to a rear end of the support rod. The grip unit comprises a grip housing and a sensor. The grip housing is configured to be gripped by an operator. The sensor is attached to the grip housing. The support rod penetrates through the grip housing. In a rear plan view of the electric working machine, the sensor does not overlap the support rod.

SUMMARY

In the electric working machine as above, a detection sensor for detecting an on/off operation for the motor by the operator and a presence sensor for detecting a grip by the operator on the grip housing are attached to the grip housing. Since the support rod penetrates through the grip housing, these sensors are disposed on an outer side relative to an outer circumferential surface of the support rod in the rear plan view of the electric working machine. This makes the grip housing thick, thus makes the grip unit thick. The disclosure herein discloses art that can suppress a grip unit from becoming thick.

The disclosure herein discloses an electric working machine. The electric working machine may comprise a support rod, a head unit, and a grip unit. The support rod may extend in a front-rear direction. The head unit may be attached to a front end of the support rod, and comprise a front tool and a motor configured to drive the front tool. The grip unit may be attached to a rear end of the support rod. The grip unit may comprise a grip housing, a detection sensor, and a presence sensor. The grip housing may be configured to be gripped by an operator. The detection sensor may be attached to the grip housing and configured to detect an on/off operation for the motor by the operator. The presence sensor may be attached to the grip housing and configured to detect a grip by the operator on the grip housing. The support rod may not penetrate through the grip housing. In a rear plan view of the electric working machine, at least one of the detection sensor and the presence sensor may at least partially overlap the support rod.

According to the above configuration, in the rear plan view of the electric working machine, the entirety of the detection sensor and the entirety of the presence sensor both do not have to be disposed outside a region overlapping the support rod. Due to this, the configuration can make the grip housing slim, thus it can make the grip unit slim, as compared to a configuration in which the entirety of the detection sensor and the entirety of the presence sensor both do not overlap the support rod in the rear plan view of the electric working machine.

DETAILED DESCRIPTION

Figure 1:
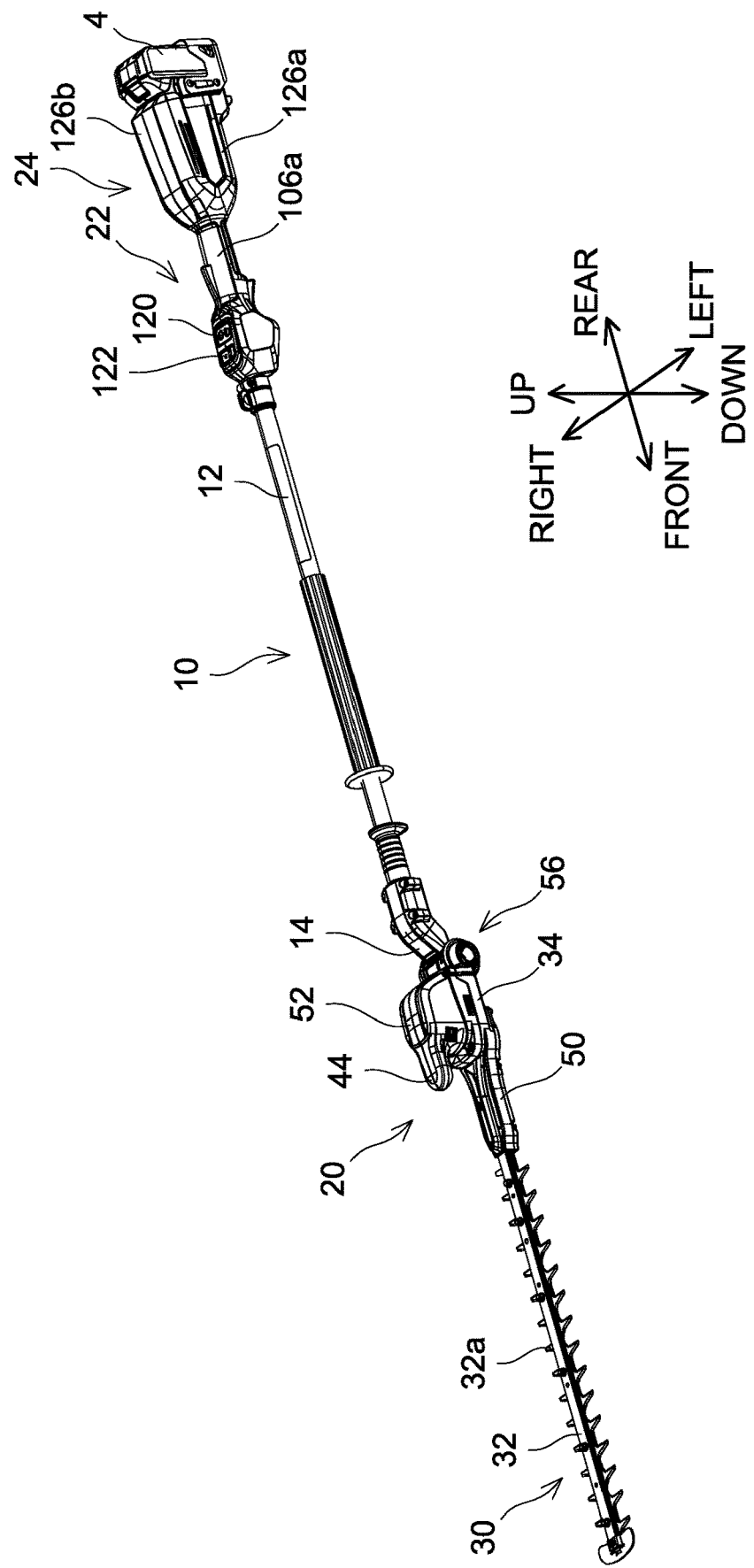
FIG. 1 is a perspective view of a working machine 2 of a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved electric working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, an electric working machine may comprise a support rod, a head unit, a position fixing mechanism, and a resistance member. The support rod may extend in a front-rear direction and comprise an attachment portion located at a front end of the support rod. The head unit may comprise a front tool, a motor configured to drive the front tool, and a head housing supporting the front tool and coupled to the attachment portion rotatably about a rotation axis. The position fixing mechanism may be configured to fix a rotation position of the head unit with respect to the support rod. The resistance member may be interposed between the attachment portion and the head housing in a direction perpendicular to the rotation axis. The resistance member may be configured to provide a resistance force against rotation of the head unit with respect to the support rod.

According to the above configuration, the resistance member provides the resistance force when the head unit rotates with respect to the support rod, thus the rotation of the head unit with respect to the support rod is suppressed. This prevents the head unit from being sharply bent toward the support rod. Thus, it is prevented that an operator inadvertently has his/her hand caught between the head unit and the support rod, for example.

In one or more embodiments, a magnitude of the resistance force changes, as the rotation position of the head unit with respect to the support rod changes.

In general, if the resistance force provided by the resistance member is constantly large, the sharp bending of the head unit toward the support rod can be prevented with certainty, however, the constantly large resistance force makes it difficult for the head unit to rotate with respect to the support rod and makes the usability deteriorated. On the other hand, if the resistance force provided by the resistance member is constantly small, the head unit easily rotates with respect to the support rod, which provides improved usability, however, safety issues rise because the head unit can be sharply bent toward the support rod. The above configuration can improve the usability while ensuring safety for the operator by changing the magnitude of the resistance force provided by the resistance member as needed.

In one or more embodiments, the rotation position of the head unit with respect to the support rod may change between a full-bent position at which the head unit is fully bent toward the support rod and an operation position at which the head unit is opened with respect to the support rod. The magnitude of the resistance force may increase without decreasing, as the rotation position of the head unit with respect to the support rod shifts from the operation position to the full-bent position.

The above configuration makes it more difficult for the head unit to rotate with respect to the support rod, as the head unit shifts from the operation position toward the fully-bent position. Thus, the sharp bending of the head unit toward the support rod can more surely be prevented when the head unit rotates with respect to the support rod from the operation position to the fully-bent position.

In one or more embodiments, the rotation position of the head unit with respect to the support rod may change between a full-bent position at which the head unit is fully bent toward the support rod and an operation position at which the head unit is opened with respect to the to support rod. The magnitude of the resistance force may decrease after having increased, as the rotation position of the head unit with respect to the support rod shifts from the operation position to the full-bent position.

The above configuration makes it difficult for the head unit to rotate with respect to the support rod, as the head unit shifts from the operation position toward a vicinity of the fully-bent position, while it makes it easier for the head unit to rotate with respect to the support rod in the vicinity of the fully-bent position. Thus, the configuration can prevent the sharp bending of the head unit toward the support rod when the head unit rotates from the operation position toward the fay-bent position, and also can facilitate the bending of the head unit toward the support rod in the vicinity of the fully-bent position.

In one or more embodiments, as the rotation position of the head unit with respect to the support rod changes, a gap between the attachment portion and the head unit at a position where the resistance member is interposed may change so that the magnitude of the resistance force changes.

In the above configuration, the magnitude of the resistance force provided by the resistance member can be changed with a simple configuration of changing the gap between the attachment portion and the head unit.

In one or more embodiments, the resistance member may be constituted of a rubber material.

In the above configuration, the resistance member can provide the resistance force without damaging or wearing the attachment portion and the head housing.

In one or more embodiments, the front tool may comprise a cutting blade for cutting an object.

In the above configuration, the electric working machine may be used as one of a mower, a hedge trimmer, and a chain saw.

In one or more embodiments, a working machine may comprise a support rod extending in a front-rear direction, and a head unit attached to a front end of the support rod. The head unit may comprise a front tool, a power transmission mechanism, a head housing, and a handle. The power transmission mechanism may be configured to transmit power to the front tool. The head housing may house the power transmission mechanism and may be rotatably attached to the support rod. The handle may extend frontward from the head housing. The handle may be configured to be gripped by an operator when the head housing is rotated with respect to the support rod. The handle may be disposed below a top portion of the head housing in an up-down direction perpendicular to the front-rear direction in a state where the working machine is placed on a placement surface.

According to the above configuration, in the event of an upper surface side of the head housing colliding against the ground surface due to the working machine being dropped, the top portion of the head housing collides with the ground surface first, thus the handle can be suppressed from colliding with the ground surface. As a result, damage to the handle can be prevented.

In one or more embodiments, the handle may extend obliquely toward a front lower side from the head housing in the state where the working machine is placed on the placement surface.

In general, application of an impact to a front end of the handle is likely to result in damage to the handle, as compared to application of an impact to a base end of the handle. In the above configuration, the front end of the handle is located lower than the base end of the handle. Due to this, in the event of the upper surface side of the head housing colliding against the ground surface due to the working machine being dropped, the base end of the handle collides with the ground surface before the front end of the handle. As a result, damage to the handle can be suppressed even when the handle collides with the ground surface.

In one or more embodiments, the handle may be located below a line connecting the top portion of the head housing and a front end of the front tool in the state where the working machine is placed on the placement surface.

In the above configuration, in the event of the upper surface side of the head housing colliding against the ground surface due to the working machine being dropped, the top portion of the head housing and the front end of the front tool collide with the ground surface first, thus the handle does not collide with the ground surface. Due to this, damage to the handle can surely be prevented.

In one or more embodiments, a length of the handle in the front-rear direction may be mm or more.

When rotating the head housing with respect to the support rod, the operator grips the handle with his/her hand. According to the above configuration, the operator can grip the handle from right side or left side with his/her multiple fingers.

In one or more embodiments, a width of the handle in a left-right direction, which is perpendicular to the front-rear direction and the up-down direction, may be 20 mm or more.

When rotating the head housing with respect to the support rod, the operator grips the handle with his/her hand. According to the above configuration, the operator can stably grip the handle from front side or from above.

In one or more embodiments, the head housing may comprise a lower head housing supporting the front tool and an upper head housing disposed above the lower head housing. The handle may extend frontward from the upper head housing. The handle may be apart by 20 mm or more from the lower head housing.

When rotating the head housing with respect to the support rod, the operator grips the handle with his/her hand. The above configuration allows the operator to insert his/her finger(s) between the front end of the handle and the lower head housing to grip the handle.

In one or more embodiments, an electric working machine may comprise a support rod, a head unit, and a grip unit. The support rod may extend in a front-rear direction. The head unit may be attached to a front end of the support rod, and comprise a front tool and a motor configured to drive the front tool. The grip unit may be attached to a rear end of the support rod. The grip unit may comprise a grip housing, a detection sensor, and a presence sensor. The grip housing may be configured to be gripped by an operator. The detection sensor may be attached to the grip housing and configured to detect an on/off operation for the motor by the operator. The presence sensor may be attached to the grip housing and configured to detect a grip by the operator on the grip housing. The support rod may not penetrate through the grip housing. In a rear plan view of the electric working machine, at least one of the detection sensor and the presence sensor may at least partially overlap the support rod.

According to the above configuration, in the rear plan view of the electric working machine, the entirety of the detection sensor and the entirety of the presence sensor bath do not have to be disposed outside a region overlapping the support rod. Due to this, tine configuration can make the grip housing slim, thus it can make the grip unit slim, as compared to a configuration in which the entirety of the detection sensor and the entirety of the presence sensor both do not overlap the support rod in the rear plan view of the electric working machine.

In one or more embodiments, the grip unit may further comprise a lever. The lever may be attached to the grip housing and configured to be operated by the operator. The presence sensor may be configured to detect the grip by the operator on the grip housing when the lever is operated.

The above configuration enables detection of the grip on the grip housing by the operator with a simple configuration.

In one or more embodiments, the electric working machine may further comprise a control unit disposed rearward of the rear end of the support rod and configured to control actuation of the motor. In the rear plan view of the electric working machine, the control unit may at least partially overlap the support rod.

According to the above configuration, in the rear plan view of the electric working machine, the entirety of the control unit does not have to be disposed outside the region overlapping the support rod. Due to this, the configuration can reduce the size of the electric working machine in the direction perpendicular to the front-rear direction, as compared to configuration in which the entirety of the control unit does not overlap the support rod in the rear plan view of the electric working machine.

In one or more embodiments, the front tool may comprise a cutting blade for cutting an object.

In the above configuration, the electric working machine may be used as one of a mower, a hedge trimmer, and a chain saw.

First Embodiment

A working machine 2 of a first embodiment will be described with reference to FIGS. 1 to 18. The working machine 2 is an electric working machine for gardening. As shown in FIG. 1, the working machine 2 is a hedge trimmer in the present embodiment. The working machine 2 extends in a front-rear direction and is used for trimming high branches. In the following description, in a state where the working machine 2 is placed on a placement surface P such as a ground surface (see FIG. 2), a longitudinal direction of the working machine 2 will be termed a front-rear direction of the working machine 2, a direction perpendicular to the placement surface P will be termed an up-down direction of the working machine 2, and a direction perpendicular to the front-rear direction and the up-down direction will be termed a left-right direction of the working machine 2.

The working machine 2 comprises a support rod 10, a head unit 20, a grip unit 22, a rear unit 24, and a battery 4. The head unit 20, the support rod 10, the grip unit 22, the rear unit 24, and the battery 4 are arranged in this order from the front toward the rear in the front-rear direction.

The support rod 10 extends in the front-rear direction. The support rod 10 comprises a rod portion 12 and an attachment portion 14. The rod portion 12 has a substantially hollow cylindrical shape extending in the front-rear direction. The rod portion 12 is a member that is gripped by an operator when the operator works with the working machine 2. The attachment portion 14 is disposed at a front end of the rod portion 12. The attachment portion 14 is located at a front end of the support rod 10. The attachment portion 14 has a shape that extends frontward from the front end of the rod portion 12 and then extends obliquely toward a front lower side.

Figure 2:
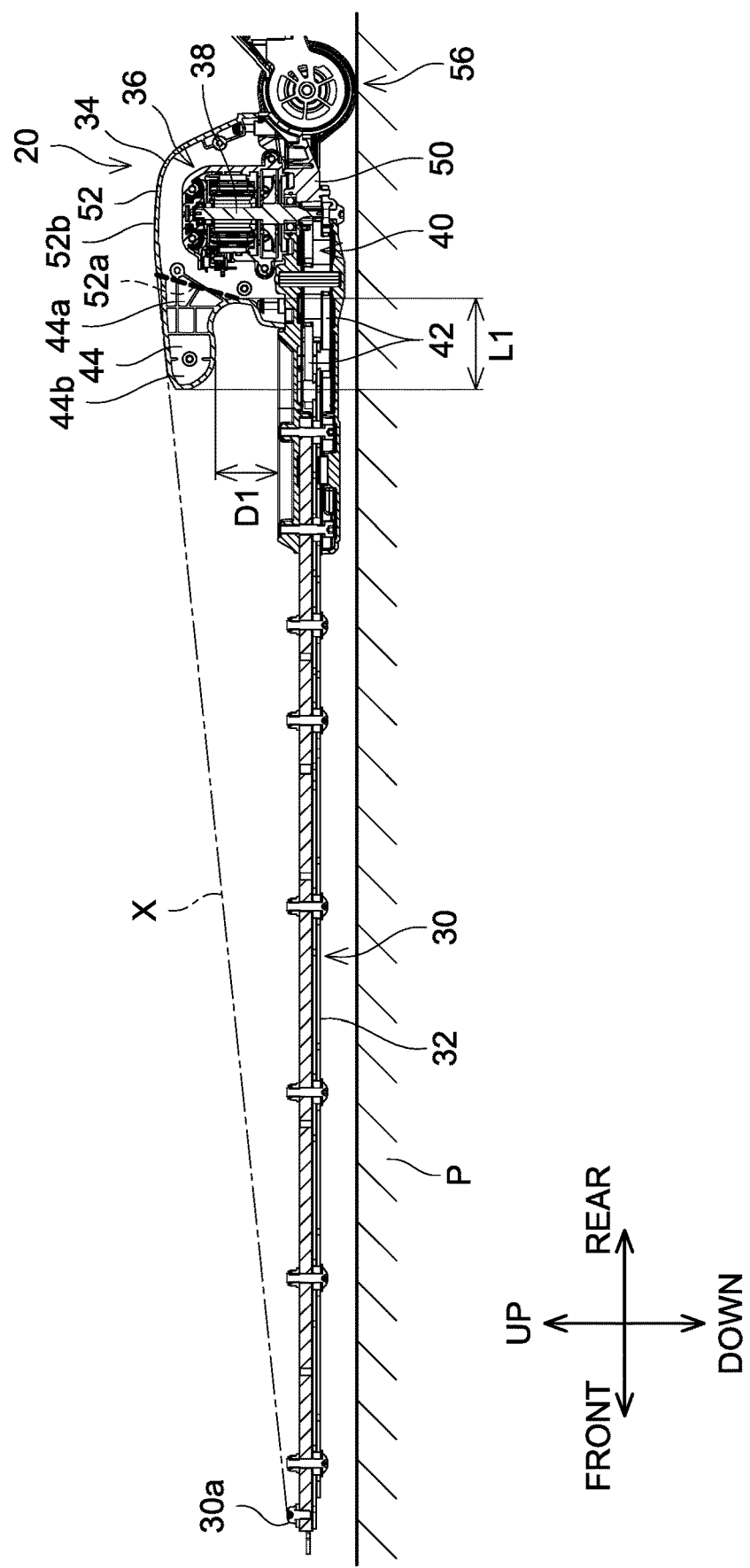
FIG. 2 is a cross-sectional view of a head unit 20 of the working machine 2 of the first embodiment.

As shown in FIG. 2, the head unit 20 comprises a front tool 30, a head housing 34, a motor 36, a power transmission mechanism 40, and a handle 44. The front tool 30 comprises a pair of cutting blades 32 configured to cut an object. The pair of cutting blades 32 extends in the front-rear direction. The cutting blades 32 overlap each other in the up-down direction. The cutting blades 32 are configured to reciprocate in opposite phases relative to each other. Specifically when one of the cutting blades 32 moves frontward, the other cutting blade 32 moves rearward, and when the one of the cutting blades 32 moves rearward, the other cutting blade 32 moves frontward. Each of the cutting blades 32 comprises a plurality of blade edges 32a arranged along the front-rear direction (see FIG. 1). When the cutting blades 32 reciprocate, hedges and trees are trimmed by the plurality of blade edges 32a.

The head housing 34 comprises a lower head housing 50 and an upper head housing 52. The lower head housing 50 supports the pair of cutting blades 32. The pair of cutting blades 32 extends frontward linearly from the lower head housing 50.

The upper head housing 52 is attached to a rear upper surface of the lower head housing 50. The upper head housing 52 houses the motor 36. The motor 36 is configured to drive the pair of cutting blades 32. The motor 36 is, for example, a brushless motor.

A shaft 38 of the motor 36 extends within both the upper head housing 52 and the lower head housing 50. The shaft 38 extends in the up-down direction. The power transmission mechanism 40 is attached to a portion of the shaft 38 that is close to a lower end thereof. The power transmission mechanism 40 is housed in the lower head housing 50. The power transmission mechanism 40 is attached to the pair of cutting blades 32. The power transmission mechanism 40 is configured to transmit power from the motor 36 to the pair of cutting blades 32 through a crank cam 42 of the power transmission mechanism 40. The power transmission mechanism 40 is configured to convert rotary motion of the shaft 38 of the motor 36 to the reciprocal motion of the pair of cutting blades 32. Since the configuration of the power transmission mechanism 40 in hedge trimmers is well known, the detailed description therefor is omitted.

The handle 44 is disposed on an upper front surface 52a of the upper head housing 52. In FIG. 2, the upper front surface 52a of the upper head housing 52 is indicated by a broken line. The handle 44 is a member to be gripped by the operator. The handle 44 extends frontward from the upper front surface 52a of the upper head housing 52. The handle 44 extends obliquely downward from its base end 44a toward its front end 44b. The front end 44b of the handle 44 is located below the base end 44a of the handle 44. The base end 44a and the front end 44b of the handle 44 are located below a top portion 52b that is located at a highest position of the upper surface of the upper head housing 52. The handle 44 is located below a straight line X connecting the top portion 52b and a front end 30a of the front tool 30. Here, the front end 30a of the front tool 30 is a highest position of the front end 30a of the front tool 30. In FIG. 2, the straight line X is indicated by a one-dot chain line.

The handle 44, from the base end 44a to the front end 44b, is separated from an upper surface of the lower head housing 50. A distance D1 between the handle 44 and the lower head housing 50 is, for example, 20 mm or more. With the distance D1 of 20 mm or more between the handle 44 and the lower head housing 50, the operator can insert his/her finger(s) between the handle 44 and the lower head housing 50 to grip the handle 44. The distance D1 between the handle 44 and the lower head housing 50 may be 35 mm or more, and in the present embodiment, the distance D1 is 50 mm. This enables the operator to more easily insert his/her finger(s) between the handle 44 and the lower head housing 50.

Further, a length of the handle 44 from the base end 44a to the front end 44b, that is, a length L1 of the handle 44 in the front-rear direction is, 25 mm or more, for example. With the length L1 of the handle 44 in the front-rear direction being 25 mm or more, the operator can grip the handle 44 from right or left side with the multiple fingers, which enables the operator to stably grip the handle 44. The length L1 of the handle 44 in the front-rear direction may be 35 mm or more, and in the present embodiment, the length L1 is 45 mm. This allows the operator to grip the handle 44 from the right or left side with more fingers.

Figure 3:
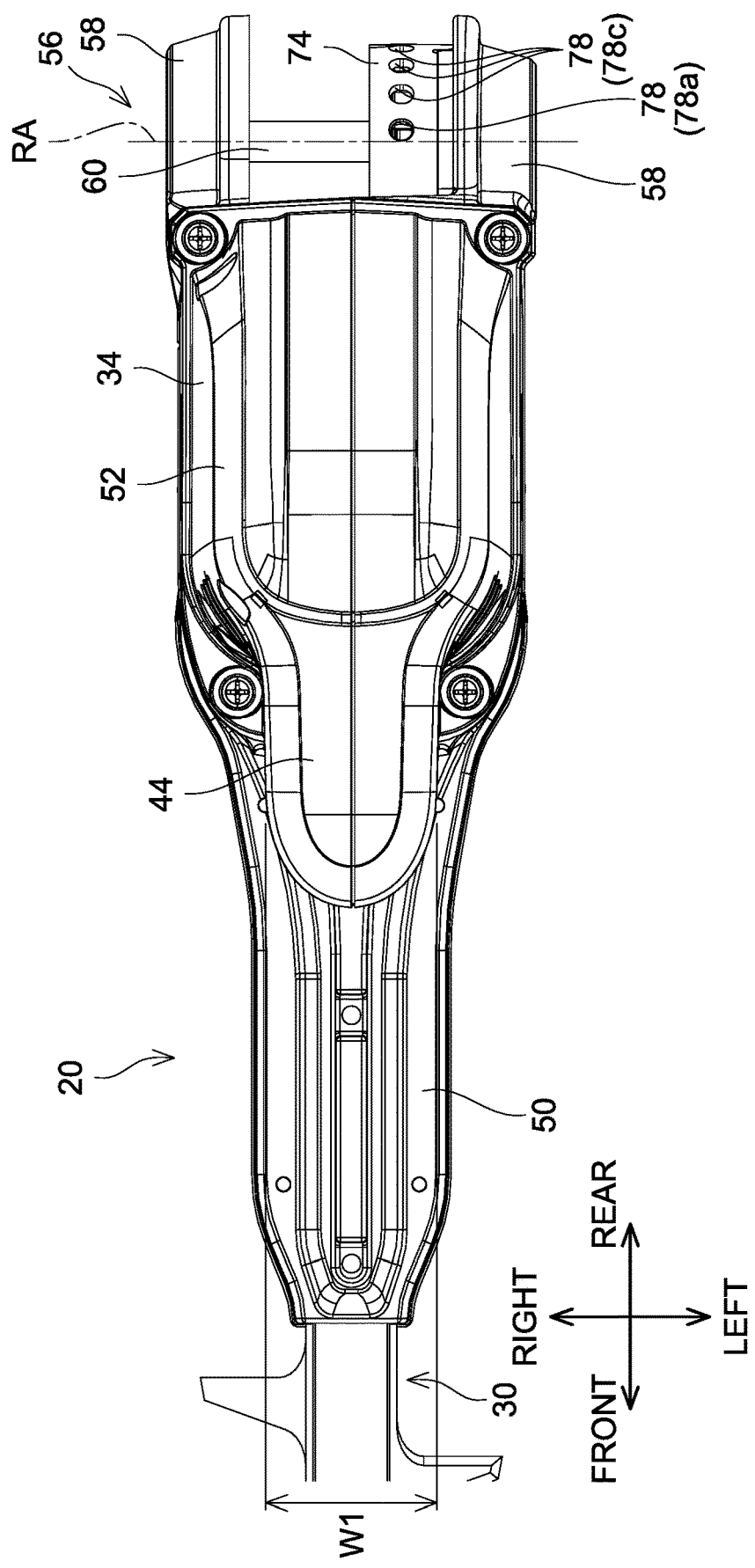
FIG. 3 is a top view of the head unit 20 of the working machine 2 of the first embodiment.

As shown in FIG. 3, a width W1 of the handle 44 in the left-right direction is 20 mm or more, for example. With the width W1 of the handle 44 in the left-right direction being 20 mm or more, the operator can stably grip the handle 44 from front side or from above. The width W1 of the handle 44 in the left-right direction may be 35 mm or more, and in the present embodiment, the width W1 is 35 mm. This allows the operator to more stably grip the handle 44 from the front side or from above.

The head housing 34 further comprises a rotation unit 56. The rotation unit 56 is disposed at a rear end of the lower head housing 50. The rotation unit 56 is located at a rear end of the head unit 20. The rotation unit 56 is coupled to the attachment portion 14 of the support rod 10. The rotation unit 56 is configured to rotate with respect to the attachment portion 14 about a rotation axis RA. Thus, the head unit 20 rotates with respect to the support rod 10 about the rotation axis RA, which results in changes in rotation position of the head unit 20 with respect to the support rod 10. The rotation axis RA extends in the left-right direction. In FIG. 3, the rotation axis RA is indicated by a one-dot chain line.

The rotation unit 56 comprises a pair of cover members 58 and a shaft member 60. The cover members 58 are separated from each other in the left-right direction. One of the cover members 58 is fixed to the rear end of the lower head housing 50, and the other cover member 58 is attached to the rear end of the lower head housing 50.

The shaft member 60 is interposed between the pair of cover members 58. A left end of the shaft member 60 is fixed to the left cover member 58, and a right end of the shaft member 60 is fixed to the right cover member 58. The shaft member 60 is supported by the pair of cover members 58. The shaft member 60 has an elongated hollow cylindrical shape extending in the left-right direction. A center axis of the shaft member 60 in the left-right direction coincides with the rotation axis RA.

Figure 4:
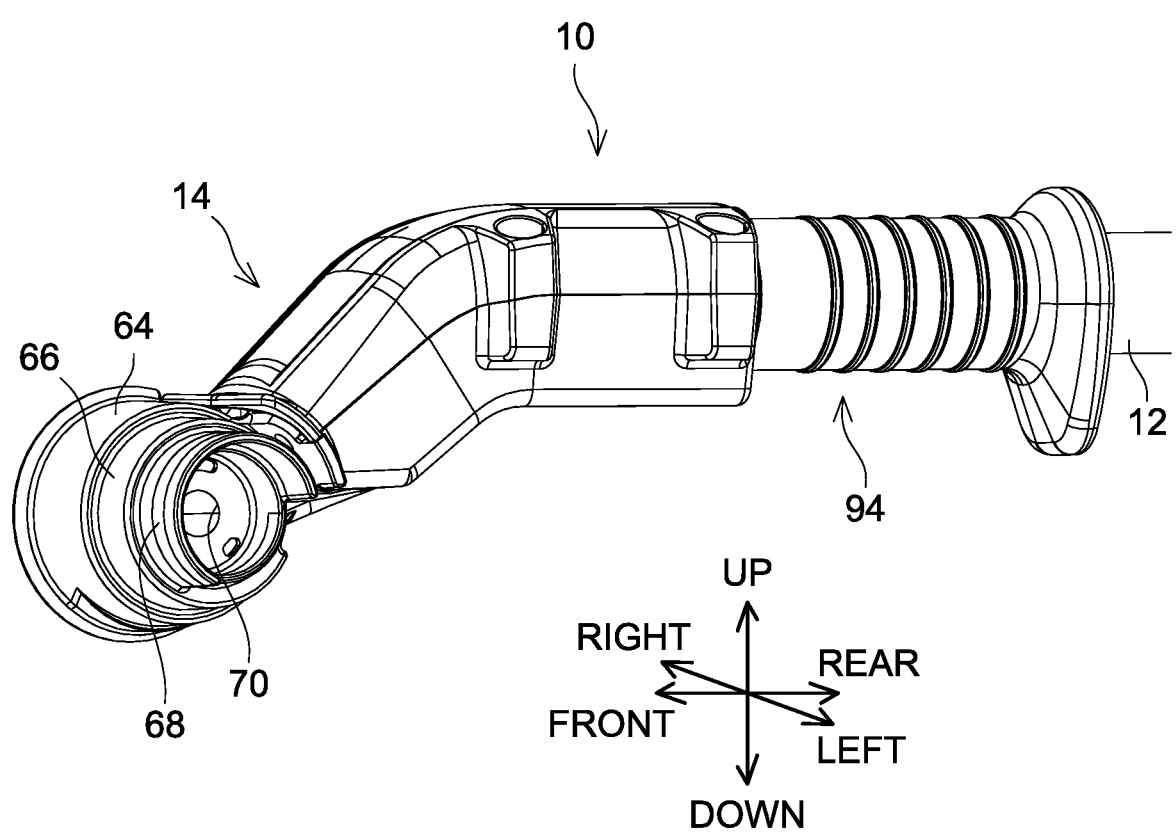
FIG. 4 is a perspective view of an attachment portion 14 of the working machine 2 of the first embodiment.

As shown in FIG. 4, the attachment portion 14 comprises a first portion 64, a second portion 66, and a third portion 68 at its front end. The first portion 64, the second portion 66, and the third portion 68 are arranged in this order from right to left in the left-right direction. The first portion 64, the second portion 66, and the third portion 68 each have a substantially hollow cylindrical shape of which center axis is the rotation axis RA. An outer circumferential surface of the second portion 66 has a smaller diameter than an outer circumferential surface of the first portion 64. An outer circumferential surface of the third portion 68 has a smaller diameter than the outer circumferential surface of the second portion 66. Each of the outer circumferential surface of the first portion 64 (see FIG. 7) and the outer circumferential surface of the third portion 68 is partially notched.

Figure 5:
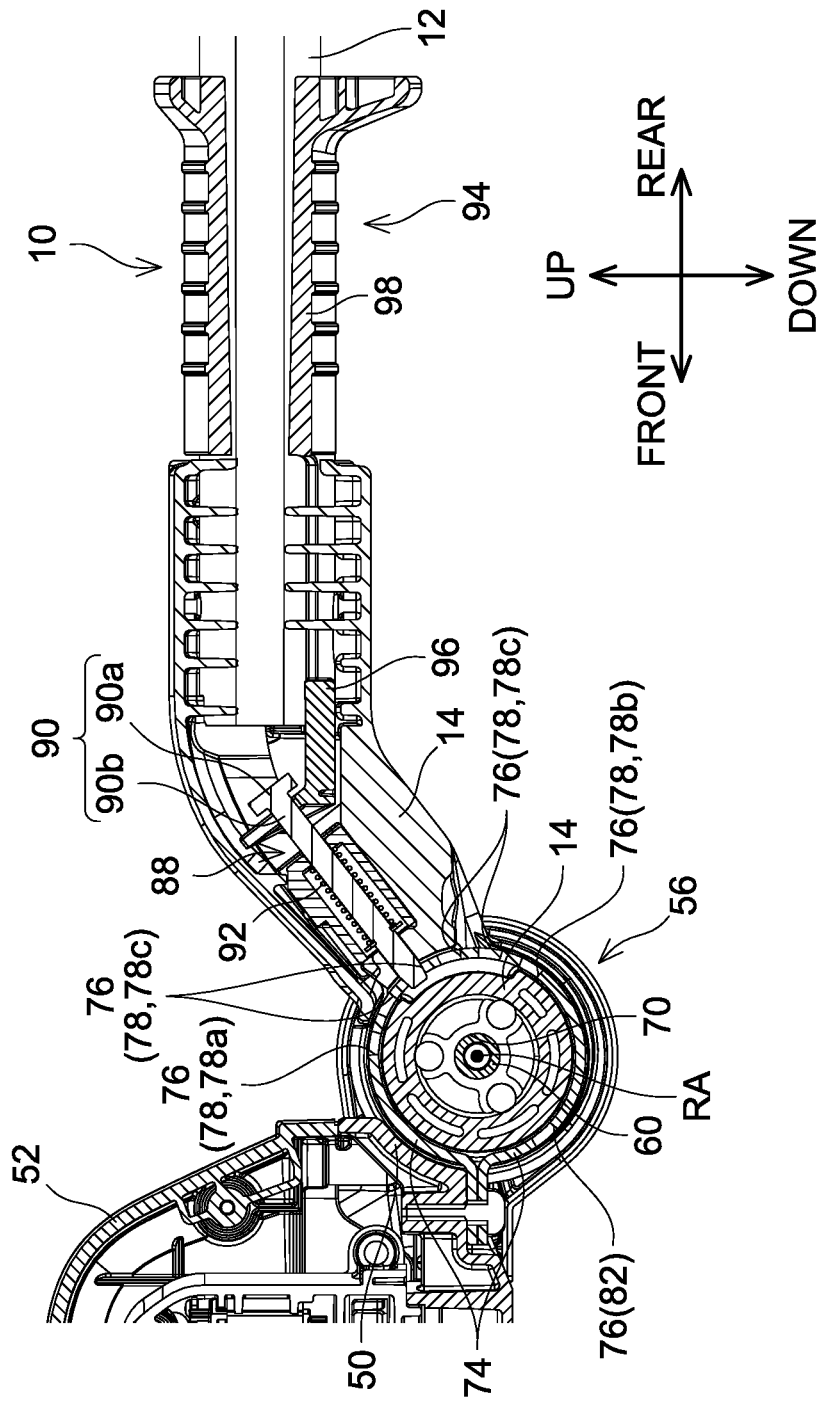
FIG. 5 is a cross-sectional view of an area around a rod portion 12 of a support rod 10, a position fixing mechanism 88, and a rotation unit 56 of the working machine 2 of the first embodiment.

As shown in FIG. 5, the attachment portion 14 includes a through hole 70. The through hole 70 is located at the front end of the attachment portion 14. The through hole 70 is defined by inner circumferential surfaces of the first portion 64, the second portion 66, and the third portion 68. The through hole 70 extends in the left-right direction. The shaft member 60 of the rotation unit 56 is inserted in the through hole 70. Due to this, the rotation unit 56 rotates with respect to the attachment portion 14 about the rotation axis RA.

As shown in FIG. 3, the rotation unit 56 further comprises a positioning plate 74. The positioning plate 74 is disposed between the cover members 58. The positioning plate 74 is fixed to the lower head housing 50. The positioning plate 74 has a substantially hollow cylindrical shape that surrounds the outer circumferential surfaces of the second portion 66 and the third portion 68 of the attachment portion 14 from outside (see FIG. 5).

Figure 11:
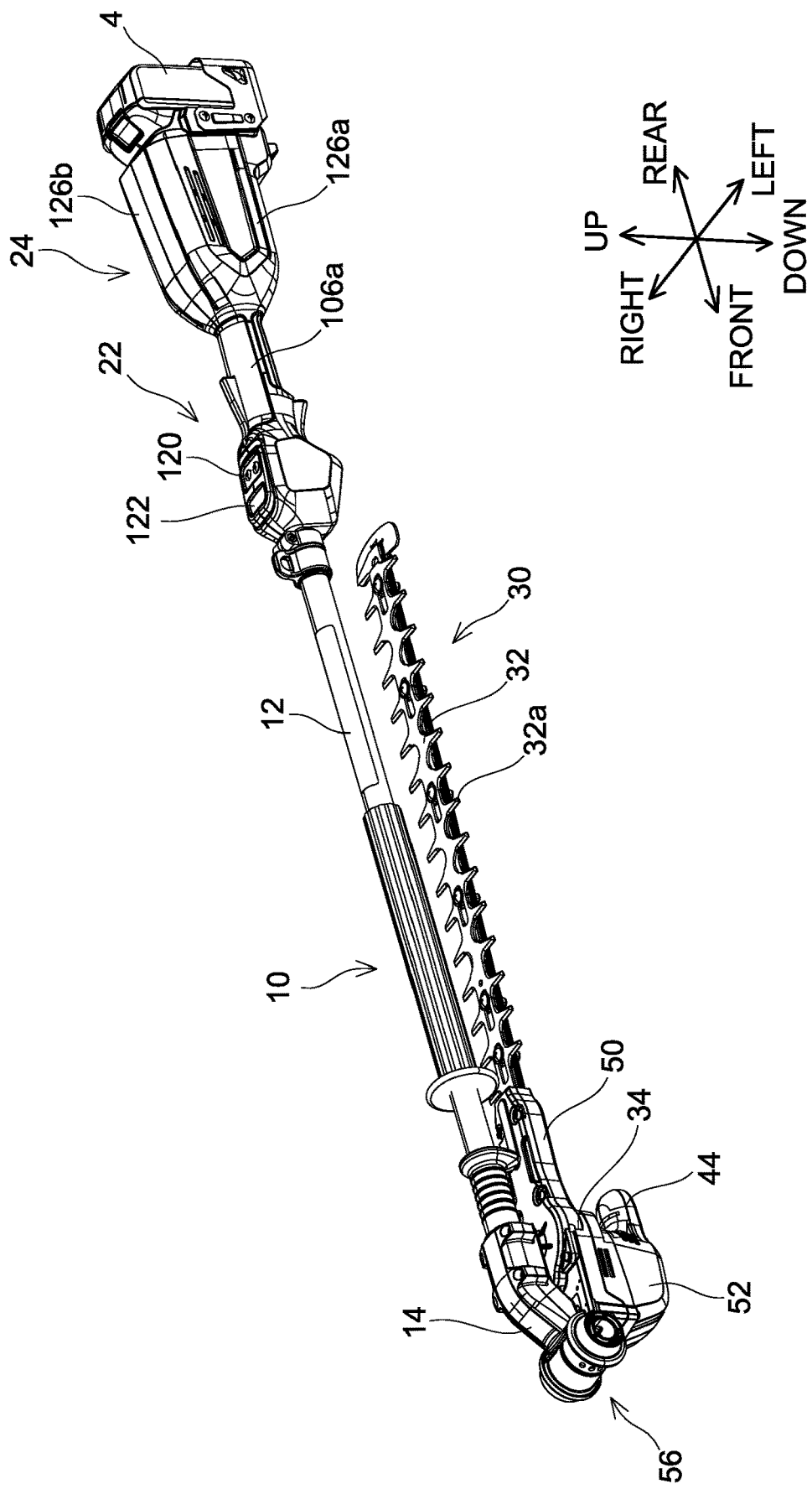
FIG. 11 is a perspective view of the working machine 2 of the first embodiment, with the shaft 90b of the insertion member 90 inserted in the fully-bent positioning opening 82.

The positioning plate 74 includes a plurality of positioning openings 76. The positioning openings 76 penetrate the positioning plate 74 in a thickness direction thereof. The positioning openings 76 are arranged along a circumferential direction of the positioning plate 74. As shown in FIG. 5, the plurality of positioning openings 76 includes one fully-bent positioning opening 82 and a plurality of (six in the present embodiment) operation positioning openings 78. The fully-bent positioning opening 82 is disposed corresponding to a fully-bent position P2 (see FIG. 9) that is used when the working machine 2 is stored. The fully-bent position P2 is a position used when the working machine 2 is stored. When the head unit 20 is in the fully-bent position P2 with respect to the support rod 10, the head unit 20 is fully bent toward the support rod 10 as shown in FIG. 11.

Figure 10:
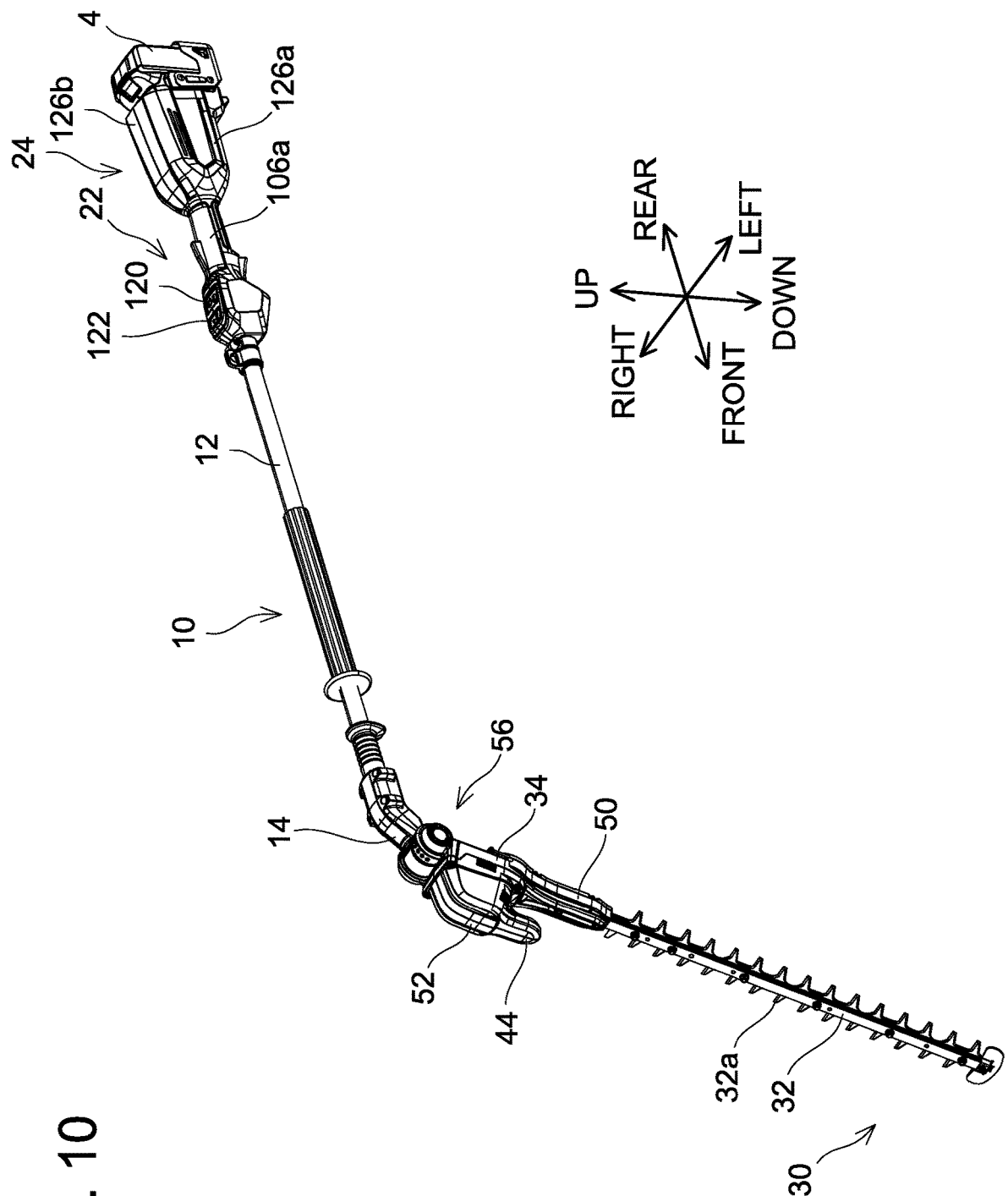
FIG. 10 is a perspective view of the working machine 2 of the first embodiment, with the shaft 90b of the insertion member 90 inserted in the proximal opening 78b.

The plurality of operation positioning openings 78 is disposed corresponding to an operation range P1 (see FIGS. 7 and 8) that is used when the operator works with the working machine 2. When the head unit 20 is within the operation range P1 with respect to the support rod 10, the head unit 20 is opened with respect to the support rod 10 as shown in FIGS. 1 and 10. The operation positioning openings 78 are disposed at equal intervals in the circumferential direction of the positioning plate 74. The plurality of operation positioning openings 78 is disposed separated from the fully-bent positioning opening 82. Hereinbelow, in a rotation range of the head unit 20 about the rotation axis RA with respect to the support rod 10, an operation positioning opening 78 that is the farthest from the fully-bent positioning opening 82 may be termed a distant opening 78a, an operation positioning opening 78 that is the closest to the fully-bent positioning opening 82 may be termed a proximal opening 78b, and the rest of the operation positioning openings 78 disposed between the distant opening 78a and the proximal opening 78b may be termed intermediate openings 78c.

Figure 8:
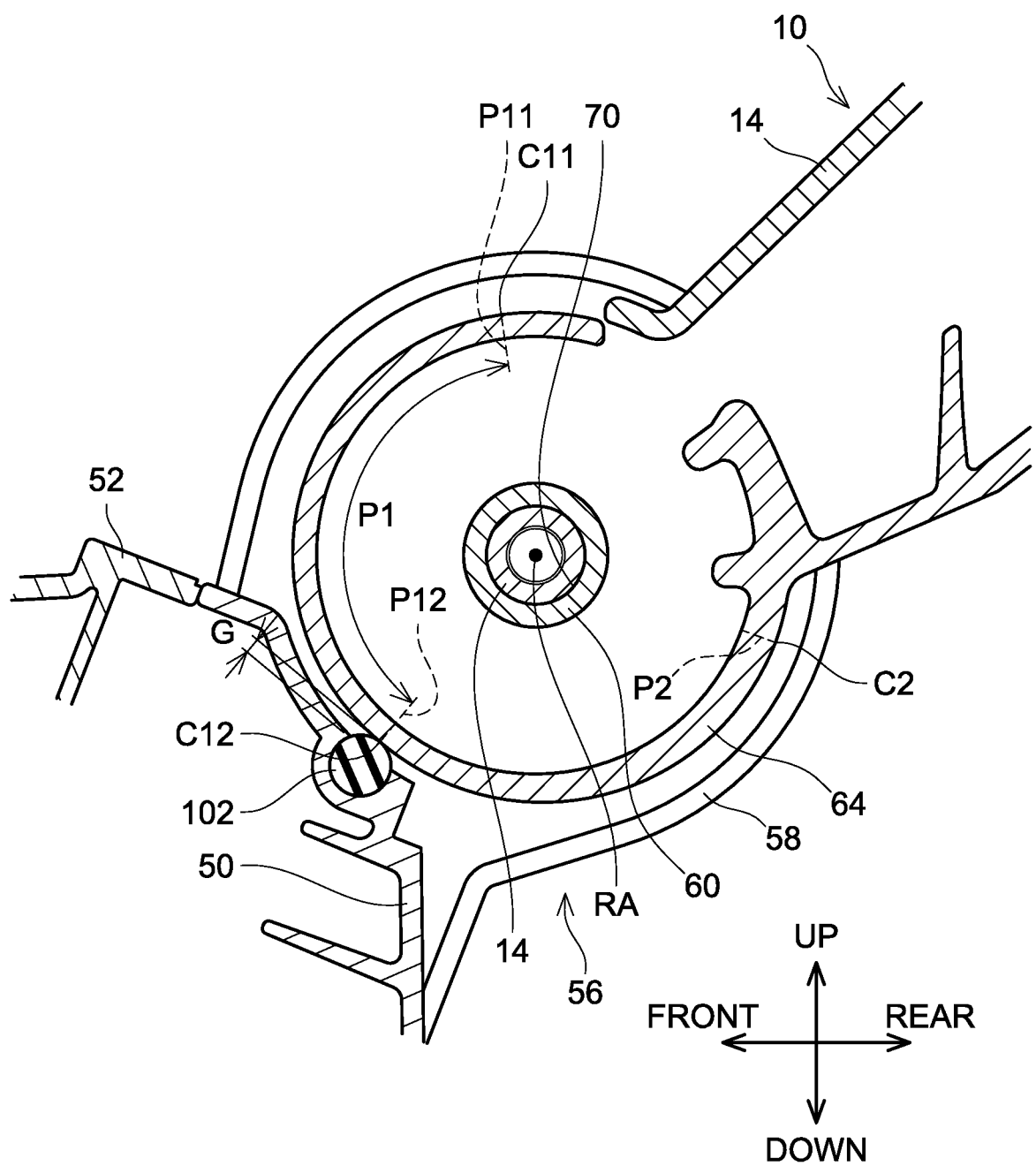
FIG. 8 is a cross-sectional view of the area around the rotation unit 56 of the working machine 2 of the first embodiment, with the shaft 90b of the insertion member 90 inserted in a proximal opening 78b.
Figure 9:
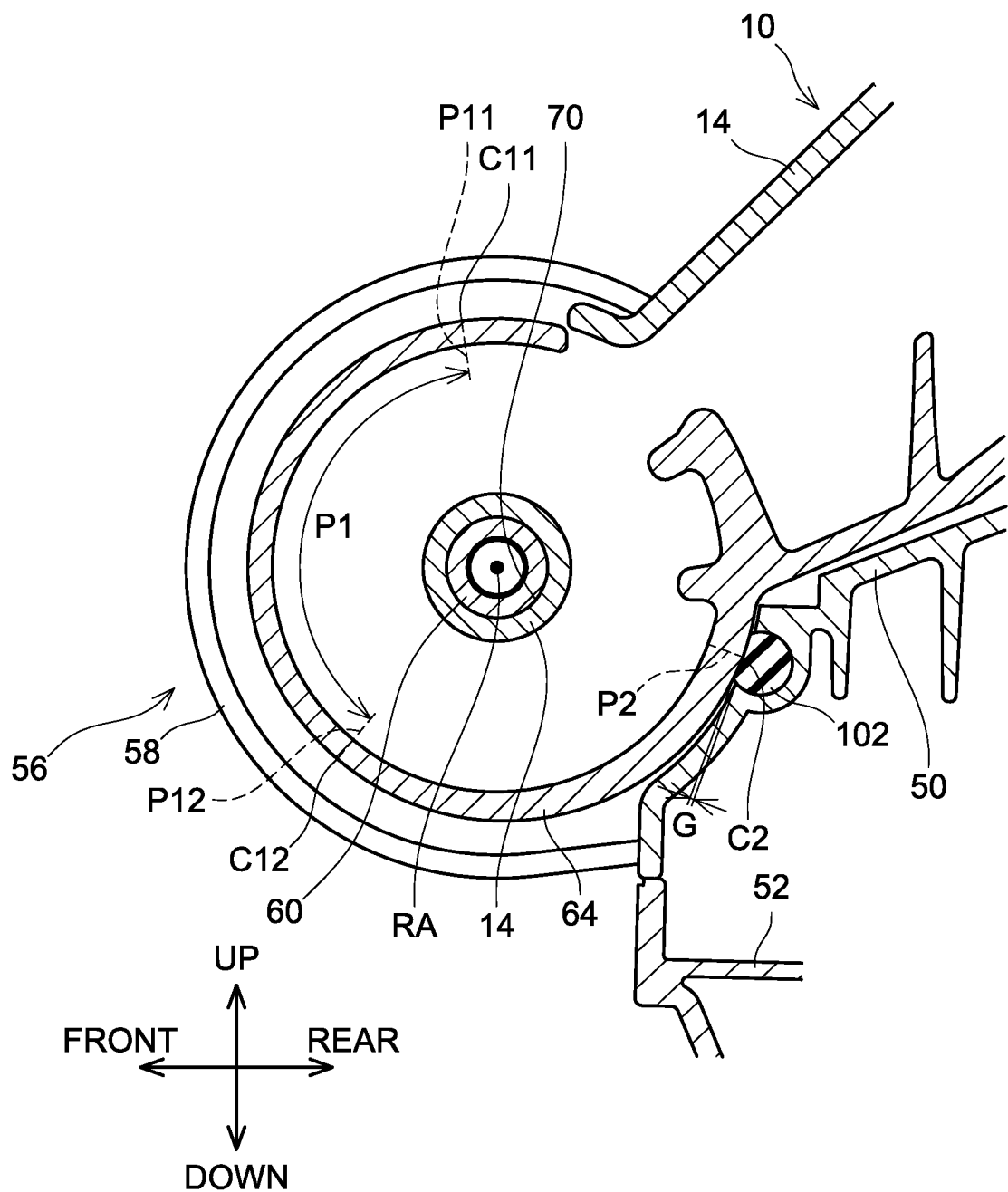
FIG. 9 is a cross-sectional dew of the area around the rotation unit 56 of the working machine 2 of the first embodiment, with the shaft 90b of the insertion member 90 inserted in a fully-bent positioning opening 82.

The support rod 10 further comprises a position fixing mechanism 88. The position fixing mechanism 88 comprises an insertion member 90, a biasing member 92, and a tension member 94. The insertion member 90 and the biasing member 92 are disposed inside the attachment portion 14. The insertion member 90 has a pin shape comprising a head 90a and a shaft 90b. The shaft 90b of the insertion member 90 is inserted to any one of the positioning openings 76. This enables the insertion member 90 to fix a rotation position of the support rod 10 with respect to the head unit 20 at various positions. Specifically, when the shaft 90b of the insertion member 90 is inserted to the fully-bent positioning opening 82, the head unit 20 is fixed at the fully-bent position P2 with respect to the support rod 10 as shown in FIG. 9. When the shaft 90b of the insertion member 90 is inserted to the distant opening 78a, the head unit 20 is fixed at a distant operation position P11 with respect to the support rod 10 (see FIGS. 7 to 9). When the shaft 90b of the insertion member 90 is inserted to the proximal opening 78b, the head unit 20 is fixed at a proximal operation position P12 with respect to the support rod 10 as shown in FIG. 8. That is, the insertion member 90 fixes the head unit 20 at the fully-bent position P2 or within the operation range P1 (that is, in the region between the distant operation position P11 and the proximal operation position P12) with respect to the support rod 10. In the present embodiment, the proximal operation position P12 corresponds to "operation position".

As shown in FIG. 5, the biasing member 92 is a coil spring, for example. The biasing member 92 is configured to bias the shaft 90b of the insertion member 90 toward the positioning openings 76. Thus, the position fixing mechanism 88 keeps the shaft 90b of the insertion member 90 inserted to one of the positioning openings 76, in its normal state.

Figure 6:
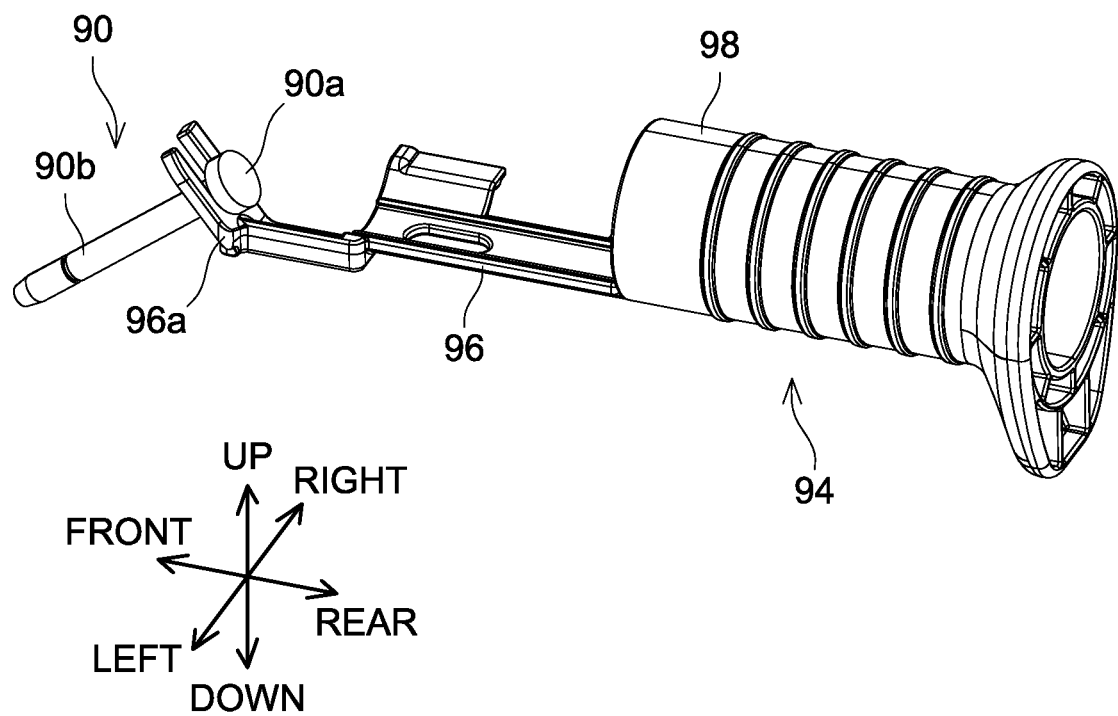
FIG. 6 is a perspective view of a tension member 94 and an insertion member 90 of the working machine 2 of the first embodiment.

The tension member 94 moves relatively to the support rod 10 in the front-rear direction. The tension member 94 comprises a front portion 96 and a rear portion 98. The front portion 96 is disposed inside the attachment portion 14. As shown in FIG. 6, a front end 96a of the front portion 96 is branched into two parts separated from each other in the left-right direction. The front end 96a of the front portion 96 interposes the shaft 90b of the insertion member 90 between the two parts, and is in contact with the head 90a. The front portion 96 supports the insertion member 90. The shaft 90b can move between the two parts of the front end 96a in a front upper direction and in a rear lower direction with respect to the tension member 94. Due to this, even when the tension member 94 moves relatively to the support rod 10 in the front-rear direction, the insertion member 90 can move together with the tension member 94. The rear portion 98 is disposed rearward of the front portion 96. The rear portion 98 is gripped by the operator when the tension member 94 is moved relatively to the support rod 10 in the front-rear direction. As shown in FIG. 5, the rear portion 98 is disposed outside of the attachment portion 14. The rear portion 98 surrounds an outer circumferential surface of the rod portion 12 at a front end thereof.

In the normal state, the shaft 90b of the insertion member 90 is inserted in one of the positioning openings 76 by the biasing force of the biasing member 92. In this state, the head unit 20 cannot rotate about the rotation axis RA with respect to the support rod 10. A position of the tension member 94 in this state will be termed a fixing position. When the tension member 94 moves relatively rearward beyond the fixing position toward the rod portion 12, the insertion member 90 moves in a radially outer direction of the rotation axis RA, which results in removal of the shaft 90b of the insertion member 90 from the positioning opening 76. With the shaft 90b removed from the positioning opening 76, the head unit 20 can rotate about the rotation axis RA with respect to the support rod 10. A position of the tension member 94 in this state will be termed a movable position. In the present embodiment, the operator pulls the tension member 94 with his/her one hand from the fixing position to the movable position, so that the operator can rotate the head unit 20, with his/her other hand, to the fully-bent position P2 or within the operation range P1 with respect to the support rod 10. The operator can fix the head unit 20 with respect to the support rod 10 by returning the tension member 94 from the movable position to the fixing position.

Figure 7:
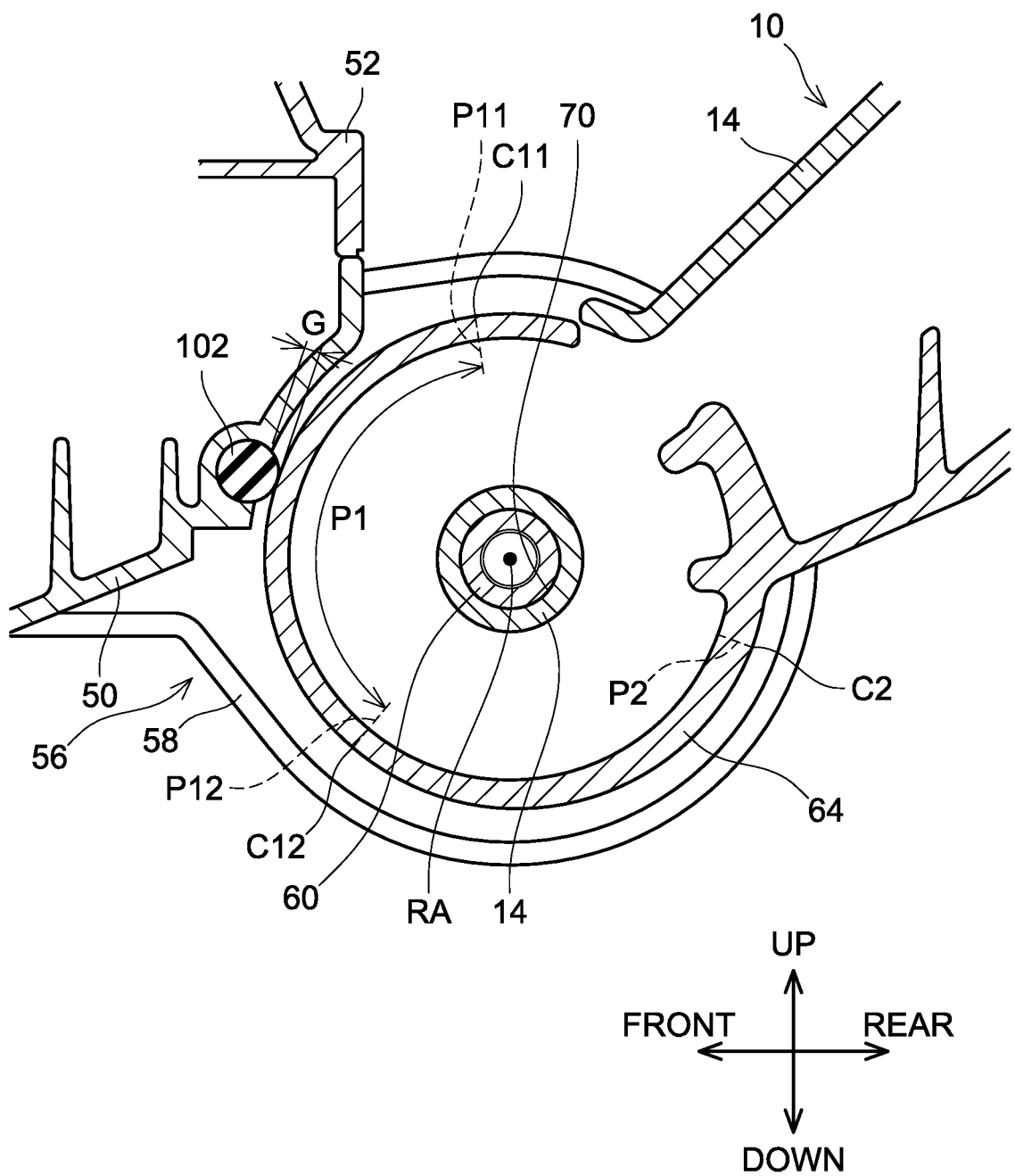
FIG. 7 is a cross-sectional view of an area around the rotation unit 56 of the working machine 2 of the first embodiment, with a shaft 90b of the insertion member 90 inserted in an intermediate opening 78c.

As shown in FIG. 7, the working machine 2 further includes a resistance member 102. The resistance member 102 is interposed between the first portion 64 of the attachment portion 14 and the lower head housing 50. The resistance member 102 is in contact with both the first portion 64 and the lower head housing 50. The resistance member 102 is fitted to the rear end of the lower head housing 50. The resistance member 102 protrudes outward (that is, rearward) from the rear end of the lower head housing 50. The resistance member 102 has a substantially solid cylindrical shape extending in the left-right direction. The resistance member 102 is constituted of an elastic material, for example, and in the present embodiment, the resistance member 102 is constituted of a rubber material. The resistance member 102 is configured to deform when an external force is applied thereto, and restore to its original shape when the external three is removed. The resistance member 102 provides a frictional force against the first portion 64 of the attachment portion 14 when the head unit 20 rotates about the rotation axis RA with respect to the support rod 10. Thus, the resistance member 102 provides a frictional force against the rotation of the head unit 20 with respect to the support rod 10. Hereinbelow, the frictional force provided by the resistance member 102 will be termed a resistance force.

When the head unit 20 rotates about the rotation axis RA with respect to the support rod 10. The resistance member 102 moves on the outer circumferential surface of the first portion 64. As shown in FIGS. 7 and 8, while the head unit 20 rotates within the operation range P1 with respect to the support rod 10, the resistance member 102 moves between a distant position C11 and a proximal position C12 on the outer circumferential surface of the first portion 64. As shown in FIG. 9, when the head unit 20 is at the fully-bent position P2 with respect to the support rod 10, the resistance member 102 is at a contacting position C2 on the outer circumferential surface of the first portion 64. The distant position C11 is a position on the outer circumferential surface of the first portion 64 that the resistance member 102 is in contact with when the head unit 20 is at the distant operation position P11 with respect to the support rod 10. The proximal position C12 is a position on the outer circumferential surface of the first portion 64 that the resistance member 102 is in contact with when the head unit 20 is at the proximal operation position P12 with respect to the support rod 10. The contacting position C2 is a position on the outer circumferential surface of the first portion 64 that the resistance member 102 is in contact with when the head unit 20 is at the fully-bent position P2 with respect to the support rod 10.

A distance between the outer circumferential surface of the first portion 64 and the rotation axis RA is constant between the distant position C11 and the proximal position C12, and the distance gradually increases from the proximal position C12 to the contacting position C2. A distance between the inner circumferential surface of the first portion 64 and the rotation axis RA is constant all along a circumferential direction of the rotation axis RA. Thus, a thickness of the first portion 64 (that is, a dimension of the first portion 64 in the radial direction of the rotation axis RA) is constant between the distant position C11 and the proximal position C12, and the thickness increases from the proximal position C12 to the contacting position C2.

A gap G is provided at a position between the first portion 64 and the lower head housing 50 where the resistance member 102 is interposed. The gap G is constant while the head unit 20 is within the operation range P1 with respect to the support rod 10 (that is, while the resistance member 102 moves between the distant position C11 and the proximal position C12 on the outer circumferential surface of the first portion 64). Thus, while the head unit 20 rotates within the operation range P1 with respect to the support rod 10, a degree of the deformation of the resistance member 102 is substantially constant, and the resistance force provided by the resistance member 102 against the first portion 64 is substantially constant. As a result, while the head unit 20 rotates within the operation range P1 with respect to the support rod 10, the resistance force provided by the resistance member 102 is substantially constant.

The gap G constantly becomes smaller, as the head unit 20 rotates from the proximal operation position P12 toward the fully-bent position P2 (that is, as the resistance member 102 moves from the proximal position C12 toward the contacting position C2 on the outer circumferential surface of the first portion 64). The gap G is the smallest when the head unit 20 is at the fully-bent position P2 with respect to the support rod 10, and the gap G barely exists as shown in FIG. 9. Thus, as the head unit 20 rotates from the proximal operation position P12 toward the fully-bent position P2 with respect to the support rod 10, the degree of the deformation of the resistance member 102 increases and the resistance force provided by the resistance member 102 against the first portion 64 increases. As a result, the resistance force provided by the resistance member 102 constantly increases, as the head unit 20 rotates from the proximal operation position P12 toward the fully-bent position P2 with respect to the support rod 10, and the resistance force is the largest when the head unit 20 is at the fully-bent position P2 with respect to the support rod 10.

Figure 12:
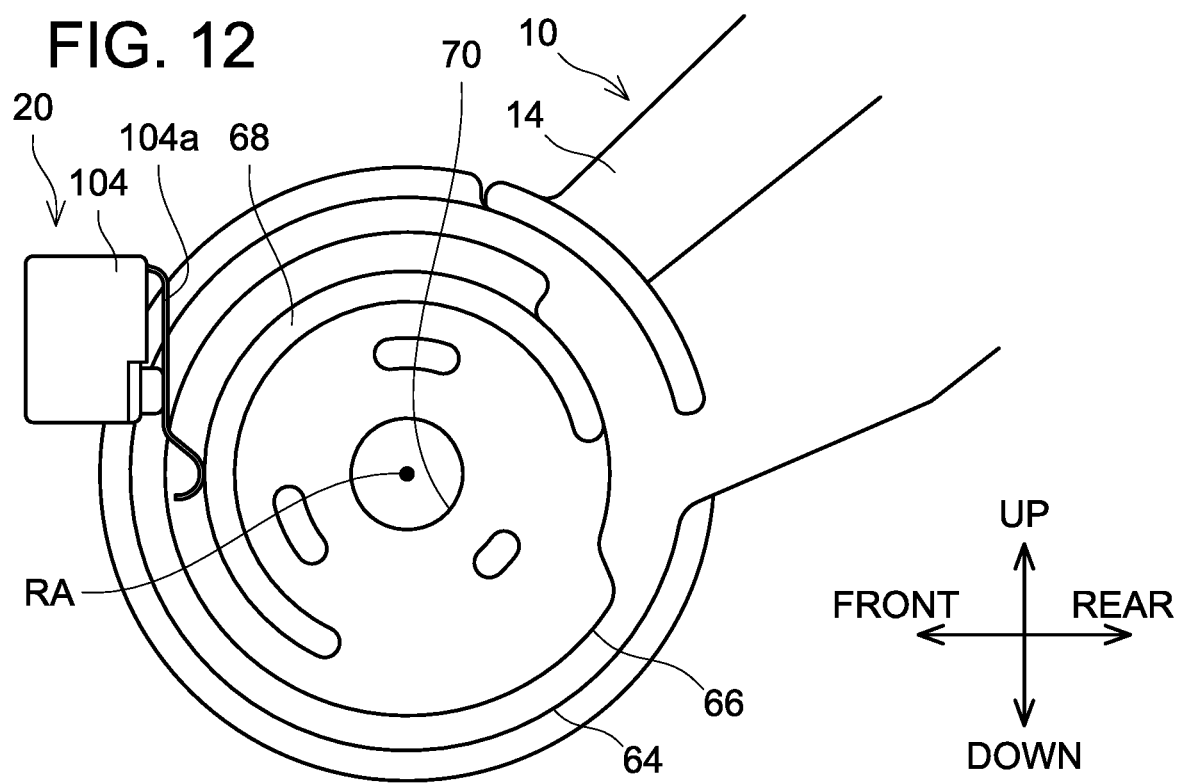
FIG. 12 is a side view of the attachment portion 14 and a position sensor 104 of the working machine 2 of the first embodiment, with the shaft 90b of the insertion member 90 inserted in the intermediate opening 78c.
Figure 13:
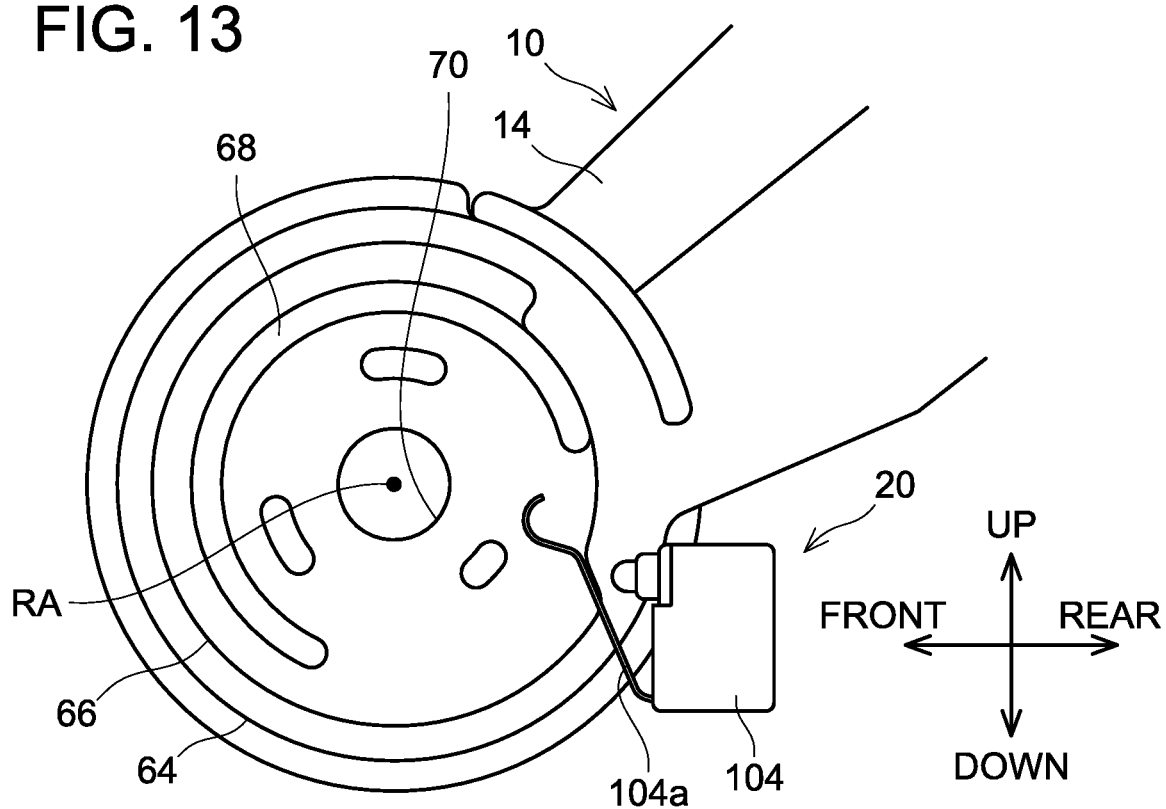
FIG. 13 is a side view of the attachment portion 14 and the position sensor 104 of the working machine 2 of the first embodiment, with the shaft 90b of the insertion member 90 inserted in the fully-bent positioning opening 82.

As shown in FIG. 12, the head unit 20 further comprises a position sensor 104. Regarding the configuration of the head unit 20, FIG. 12 shows only the position sensor 104. Although not shown, the position sensor 104 is attached to the rear end of the lower head housing 50. The position sensor 104 is connected to a control board 130, which will be described later. The position sensor 104 is configured to detect the rotation position of the head unit 20 with respect to the support rod 10. When the head unit 20 rotates about the rotation axis RA with respect to the support rod 10, the position sensor 104 moves in a direction along the outer circumferential surface of the third portion 68 of the support rod 10. As shown in FIG. 12, while the head unit 20 is within the operation range P1 with respect to the support rod 10, a detection piece 104a of the position sensor 104 is in contact with the third portion 68 of the attachment portion 14 of the support rod 10 and is thereby pressed in. In this state, the position sensor 104 outputs an on-signal to the control board 130, and the control board 130 thereby allows actuation of the motor 36. On the other hand, as shown in FIG. 13, when the head unit 20 is at the fully-bent position P2 with respect to the support rod 10, the detection piece 104a of the position sensor 104 is separated from the third portion 68 and is not pressed in. In this state, the position sensor 104 outputs an off-signal to the control board 130, and the control board 130 thereby prohibits the actuation of the motor 36. Thus, it can be prevented that the motor 36 is accidentally actuated and the pair of cutting blades 32 is thereby driven when the head unit 20 is fully bent toward the support rod 10.

Figure 14:
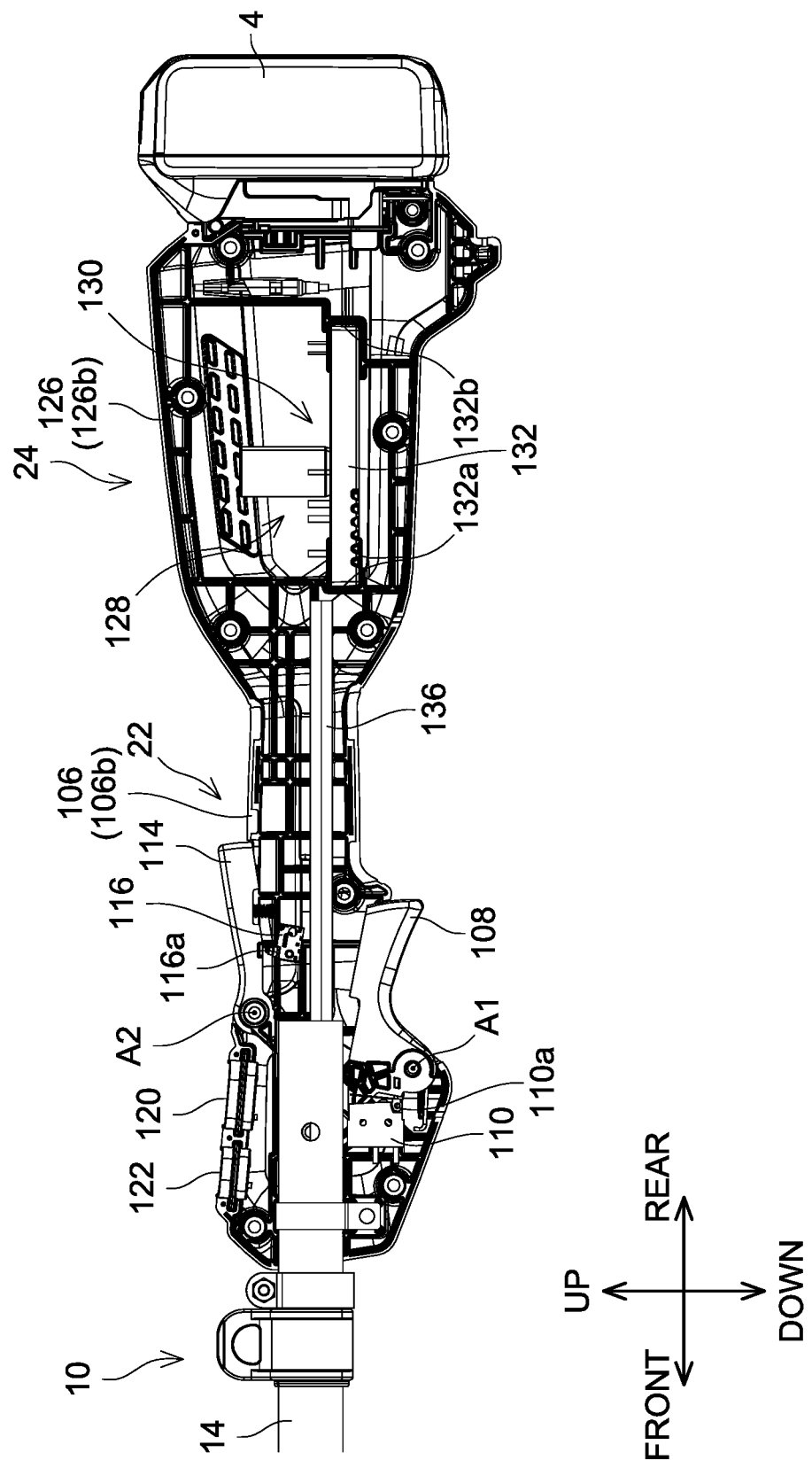
FIG. 14 is a side view of the working machine 2 of the first embodiment, with a left grip housing 106a and a left rear housing 126a removed.

As shown in FIG. 14, the grip unit 22 is attached to a rear end of the rod portion 12 of the support rod 10. The grip unit 22 comprises a grip housing 106, a trigger 108, a detection sensor 110, a lever 114, and a presence sensor 116. The grip housing 106 is a member configured to be gripped by the operator with the other hand than the hand with which the operator grips the rod portion 12 of the support rod 10 when the operator uses the working machine 2 for work. The grip housing 106 is constituted of a resin material in a shape that covers an outer circumferential surface of the support rod 10. The support rod 10 does not penetrate through the grip housing 106 and is attached to the grip housing 106.

The grip housing 106 comprises a left grip housing 106a (see FIG. 1) and a right grip housing 106b. The left grip housing 106a defines an outer shape of a left-haft surface of the grip housing 106, and the right grip housing 106b defines an outer shape of a right-half surface of the grip housing 106. The left grip housing 106a and the right grip housing 106b interpose the support rod 10 therebetween.

A power switch 120 and a display lamp 122 are disposed on a front upper surface of the grip housing 106. The power switch 120 is a switch for switching the working machine 2 between an on-state and an off-state. The display lamp 122 is configured to light up when the working machine 2 is in the on-state and go off when the working machine 2 is in the off-state.

The trigger 108 is attached to a lower surface of the grip housing 106. The trigger 108 is disposed rearward of the power switch 120 and the display lamp 122. The trigger 108 is a member with which the operator performs on/off operation for the motor 36. The trigger 108 rotates about an axis A1 extending in the left-right direction.

The detection sensor 110 is attached inside the grip housing 106. The detection sensor 110 is connected to the control board 130, which will be described later. The detection sensor 110 comprises a detection piece 110a. When the trigger 108 is pressed in by the operator, the trigger 108 rotates and the detection piece 110a is thereby pressed. In this state, the detection sensor 110 outputs an on-signal to the control board 130 and the control board 130 thus actuates the motor 36. On the other hand, in a state where the trigger 108 is not pressed in by the operator, the trigger 10$ is separated from the detection piece 110a. In this state, the detection sensor 110 outputs an of to the control board 130 and the control board 130 thus stops the motor 36.

Figure 15:
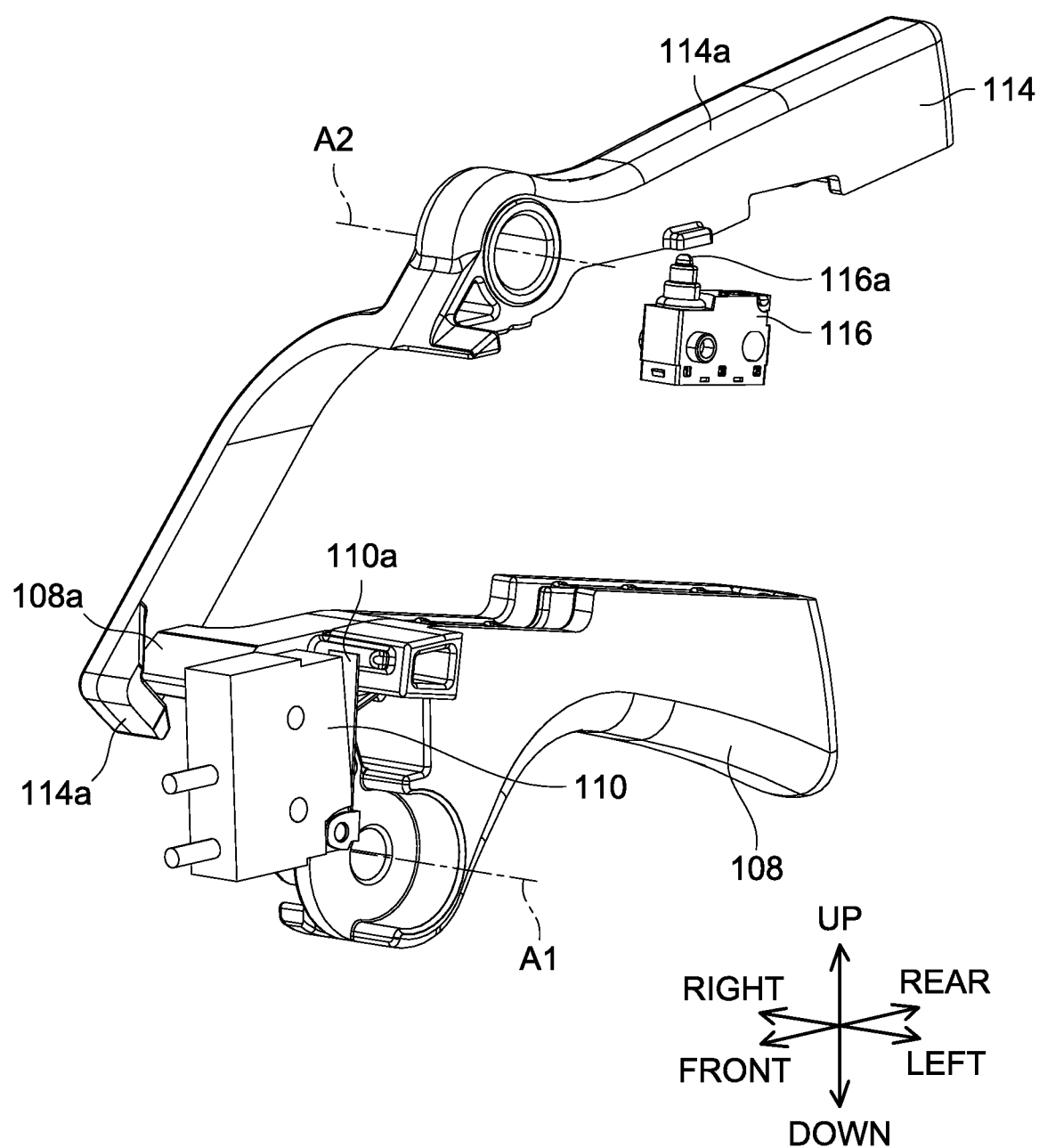
FIG. 15 is a perspective view of a trigger 108, a detection sensor 110, a lever 114, and a presence sensor 116 of the working machine 2 of the first embodiment.

The lever 114 is attached to the upper surface of the grip housing 106. As shown in FIG. 15, the lever 114 comprises a shark tin 114a and an engagement member 114b. The shark fin 114a is integrated with the engagement member 114b. The shark fin 114a is a portion configured to be operated by the operator. The shark fin 114a is configured to rotate about an axis A2 extending in the left-right direction. In a state where the shark fin 114a is not pressed in by the operator, the engagement member 114b is engaged with a distal end 108a of the trigger 108. In this state, the operator is prohibited from pressing in the trigger 108. On the other hand, when the shark fin 114a is pressed in by the operator, the engagement member 114b separates from the distal end 108a of the trigger 108, which allows the operator to press in the trigger 108. The operator can perform an operation of actuating the motor 36 by pressing the shark fin 114a in with the palm of one hand and pressing the trigger 108 in with the finger of the same hand.

As shown in FIG. 14, the presence sensor 116 is attached inside the grip housing 106. The presence sensor 116 is connected to the control board 130, which will be described later. The presence sensor 116 is configured to detect whether or not the operator is gripping the grip housing 106. In the present embodiment, the shark fin 114a presses a switch 116a of the presence sensor 116 when the operator grips the grip housing 106 and presses the shark fin 114a in with his/her palm, based on which the presence sensor 116 detects the grip by the operator on the grip housing 106. In this case, the presence sensor 116 outputs an on-signal to the control board 130, and the control board 130 thus allows the actuation of the motor 36. On the other hand, the shark fin 114a is separated from the switch 116a of the presence sensor 116 while the operator does not grip the grip housing 106 and does not press the shark fin 114a in by the palm, thus the presence sensor 116 does not detect the grip by the operator on the grip housing 106. In this case, the presence sensor 116 outputs an off-signal to the control board 130, and the control board 130 thus prohibits the actuation of the motor 36.

Figure 16:
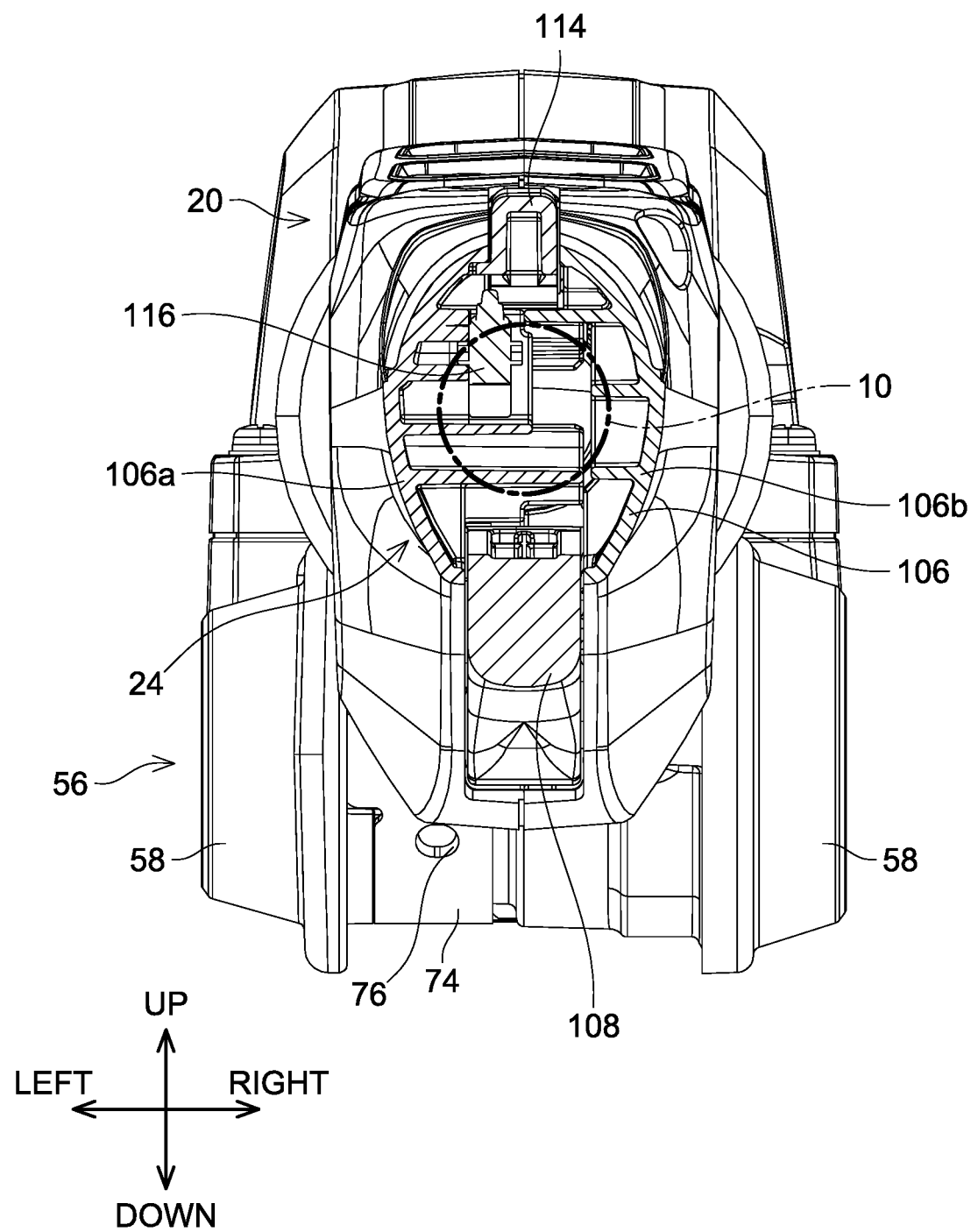
FIG. 16 is a cross-sectional view of an area around the presence sensor 116 of the working machine 2 of the first embodiment, with the working machine 2 seen from the rear.

As shown in FIG. 14, the presence sensor 116 is disposed in an extended region that extends rearward from the rear end of the support rod 10. As shown in FIG. 16, in a rear plan view of the working machine 2, the presence sensor 116 partially overlaps the support rod 10. In FIG. 16, the position of the support rod 10 is indicated by a one-dot chain line.

As shown in FIG. 14, the rear unit 24 is disposed at a rear end of the grip housing 106. The rear unit 24 comprises a rear housing 126 and a control unit 128. The rear housing 126 is disposed at the rear end of the grip housing 106. The rear housing 126 is constituted of a resin material. The rear housing 126 comprises a left rear housing 126a (see FIG. 1) and a right rear housing 126b. The left rear housing 126a defines an outer shape of a left-half surface of the rear housing 126 and is integrated with the left grip housing 106a. The right rear housing 126b defines an outer shape of a right-half surface of the rear housing 126 and is integrated with the right grip housing 106b.

The control unit 128 is housed inside the rear housing 126. The control unit 128 is disposed rearward of the rear end of the support rod 10. The control unit 128 is configured to control the actuation of the motor 36 in accordance with operator's operations on the power switch 120, the trigger 108, and the shark fin 114a of the lever 114.

Figure 17:
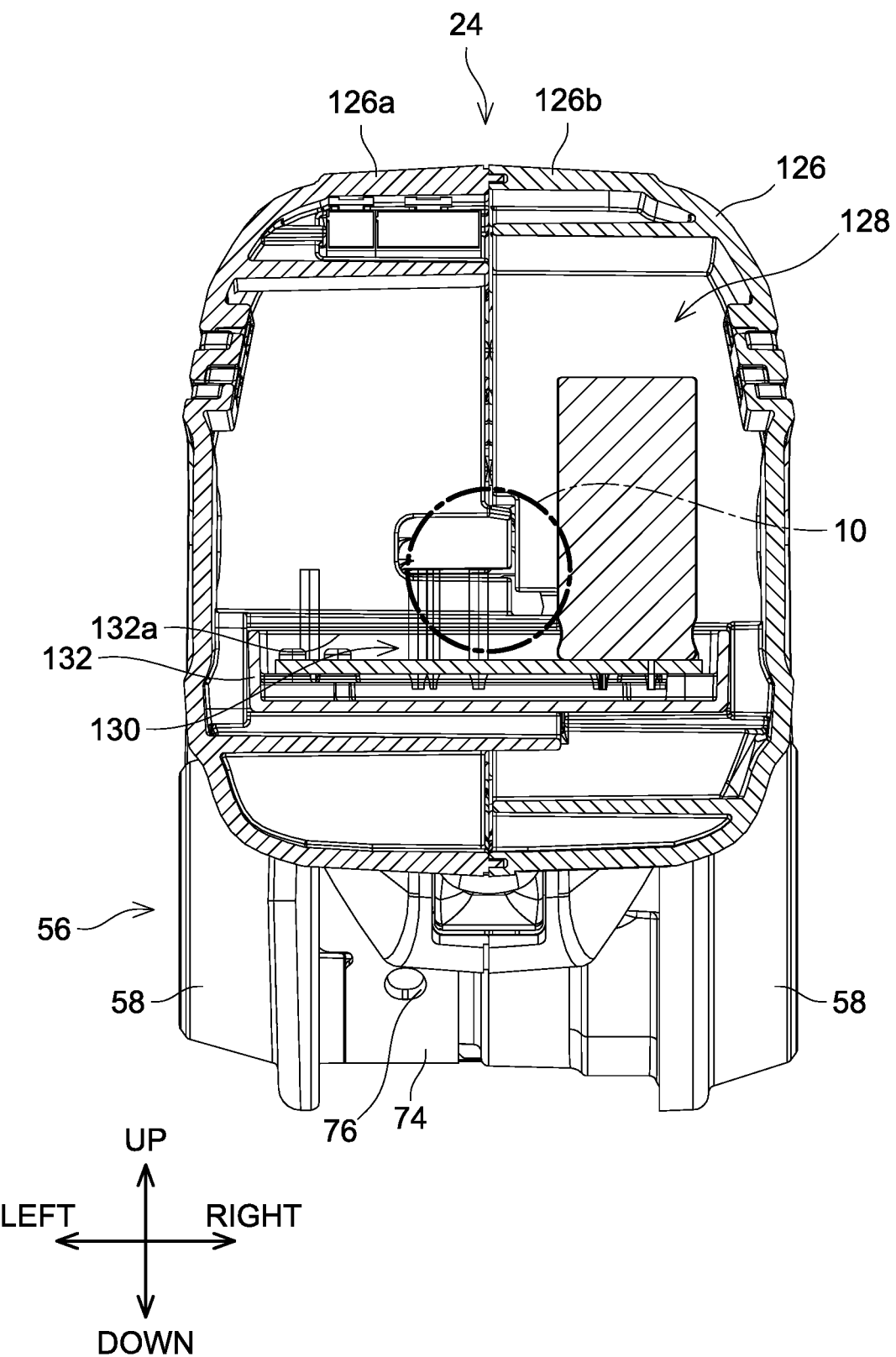
FIG. 17 is a cross-sectional view of an area around a control unit 128 of the working machine 2 of the first embodiment, with the working machine 2 seen from the rear.

The control unit 128 comprises the control board 130 and a casing 132. The control board 130 comprises a plurality of switching elements (not shown) for controlling electric power to be supplied to the motor 36. The electric power is supplied to the motor 36 through a cable 136 extending from the control board 130. The cable 136 extends through the inside of the rear housing 126, the inside of the grip housing 106, and the inside of the support rod 10. The casing 132 fixes the control board 130. The control unit 128 is in the extended region extending rearward from the rear end of the support rod 10. The casing 132 extends in the front-rear direction. As shown in FIG. 17, in the rear plan view of the working machine 2, the control board 130 and a front end 132a and a rear end 132b (not shown in FIG. 17) of the casing 132 overlap the support rod 10. That is, in the rear plan view of the working machine 2, the control unit 128 partially overlaps the support rod 10. In FIG. 17, the position of the support rod 10 is indicated by a one-dot chain line.

Figure 18:
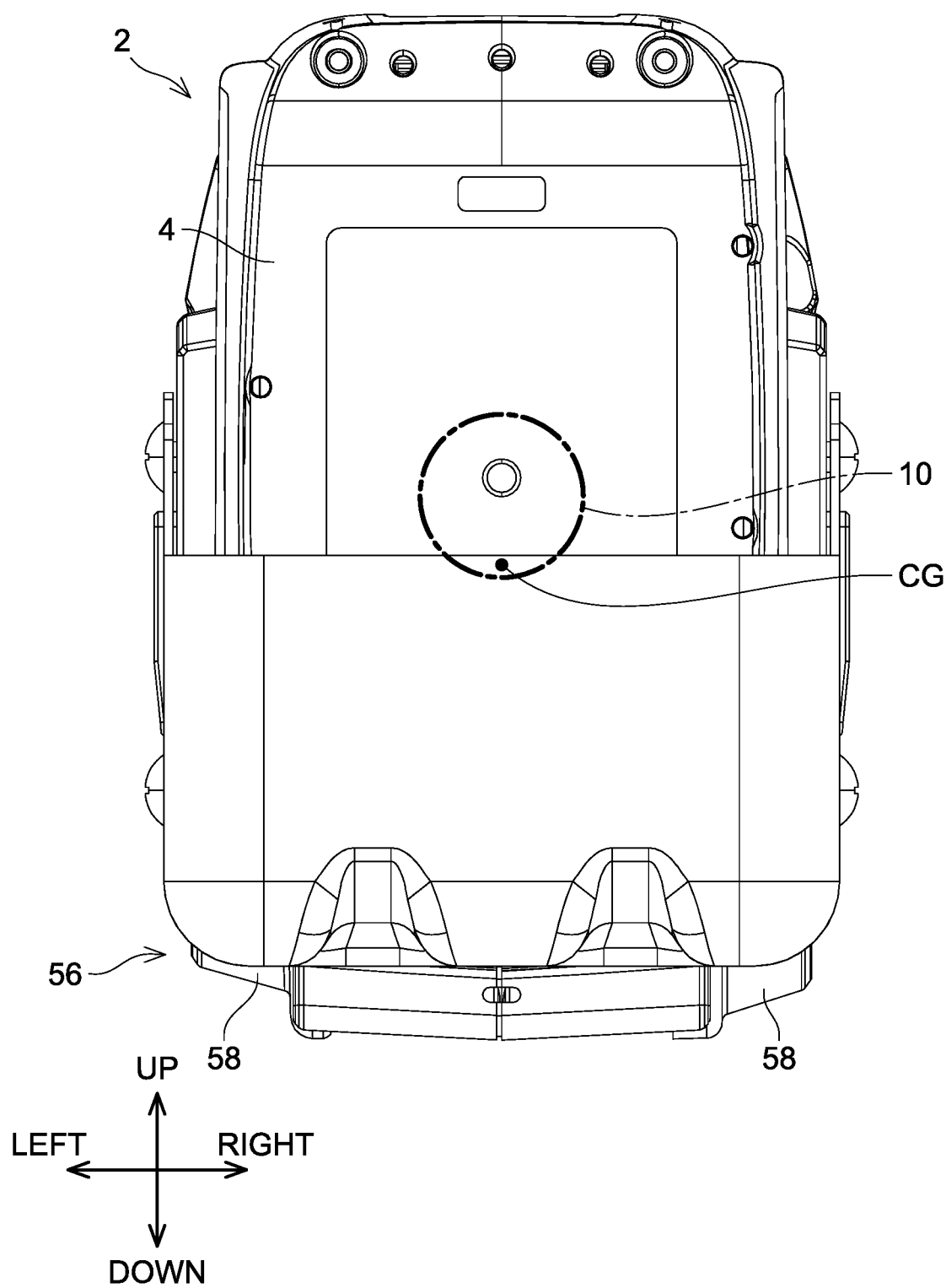
FIG. 18 is a rear plan view of the working machine 2 of the first embodiment.

As shown in FIG. 14, the battery 4 is detachably attached to a rear end of the rear housing 126. The battery 4 is located at the rear end of the working machine 2. The electric power from the battery 4 is supplied to the respective constituent elements of the working machine 2 via the control board 130. The battery 4 is in the extended region extending rearward from the rear end of the support rod 10. As shown in FIG. 18, in the rear plan view of the working machine 2, the battery 4 overlaps the support rod 10. In FIG. 18, the position of the support rod 10 is indicated by a one-dot chain line.

In the rear plan view of the working machine 2, a gravity center CG of the working machine 2 is located within the range of the support rod 10. In FIG. 18, the gravity center CG of the working machine 2 is indicated by a black circle. Such placement of the gravity center CG of the working machine 2 facilitates handling of the working machine 2 when the operator uses the working machine 2.

The working machine 2 of the embodiment is an electric working machine. The working machine 2 comprises the support rod 10, the head unit 20, the position fixing mechanism 88, and the resistance member 102. The support rod 10 extends in the front-rear direction and comprises the attachment portion 14 located at the front end of the support rod 10. The head unit 20 comprises the front tool 30, the motor 36 configured to drive the front tool 30, and the head housing 34 supporting the front tool 30 and coupled to the attachment portion 14 rotatably about the rotation axis. As shown in FIG. 5, the position fixing mechanism 88 is configured to fix the rotation position of the head unit 20 with respect to the support rod 10. As shown in FIG. 7, the resistance member 102 is interposed between the attachment portion 14 and the head housing 34 in the direction perpendicular to the rotation axis RA. The resistance member 102 is configured to provide a resistance force against the rotation of the head unit 20 with respect to the support rod 10.

According to the above configuration, the resistance member 102 provides the resistance force when the head unit 20 rotates with respect to the support rod 10, thus the rotation of the head unit 20 with respect to the support rod 10 is suppressed. This prevents the head unit 20 from being sharply bent toward the support rod 10. Thus, it is prevented that the operator inadvertently has his/her hand caught between the head unit 20 and the support rod 10, for example.

Further, since the resistance member 102 is interposed between the attachment portion 14 and the head housing 34 in the direction perpendicular to the rotation axis RA, a larger resistance force is provided as compared to a configuration in which the resistance member 102 is interposed between members in a direction along the rotation axis RA, like a disk spring, for example. This more surely prevents the head unit 20 from being sharply bent with respect to the support rod 10.

The magnitude of the resistance force changes, as the rotation position of the head unit 20 with respect to the support rod 10 changes.

In general, if the resistance force provided by the resistance member 102 is constantly large, the sharp bending of the head unit 20 toward the support rod 10 can surely be prevented, however, the constantly large resistance force makes it difficult for the head unit 20 to rotate with respect to the support rod 10 and makes the usability deteriorated. On the other hand, if the resistance force provided by the resistance member 102 is constantly small, the head unit 20 easily rotates with respect to the support rod 10, which provides improved usability, however, safety issues rise because the head unit 20 can be sharply bent toward the support rod 10. The above configuration can improve the usability while ensuring safety for the operator by changing the magnitude of the resistance force provided by the resistance member 102 as needed.

As shown in FIGS. 7 to 9, the rotation position of the head unit 20 with respect to the support rod 10 changes between the full-bent position P2 at which the head unit 20 is fully bent toward the support rod 10 and the operation position P12 at which the head unit 20 is opened with respect to the support rod 10. The magnitude of the resistance force increases without decreasing, as the rotation position of the head unit 20 with respect to the support rod 10 shifts from the operation position P12 to the full-bent position P2.

The above configuration makes it more difficult for the head unit 20 to rotate with respect to the support rod 10, as the head unit 10 shifts from the operation position P12 toward the fully-bent position P2. Thus, the sharp bending of the head unit 20 toward the support rod 10 can more surely be prevented when the head unit 20 rotates with respect to the support rod 10 from the operation position P2 to the fully-bent position P12.

As shown in FIGS. 7 to 9, the gap G between the attachment portion 14 and the head unit 20 at a position where the resistance member 102 is interposed changes, as the rotation position of the head unit 20 with respect to the support rod 10 changes, so that the magnitude of the resistance force changes.

In the above configuration, the magnitude of the resistance force provided by the resistance member 102 can be changed with the simple configuration of changing the gap between the attachment portion 14 and the head unit 20.

The resistance member 102 is constituted of a rubber material.

In the above configuration, the resistance member 102 can provide the resistance force without damaging or wearing the attachment portion 14 and the head housing 34.

The front tool 30 comprises the cutting blades 32 for cutting an object.

In the above configuration, the working machine 2 can be used as one of a mower, a hedge trimmer, and a chain saw.

A working machine 2 comprises a support rod 10 extending in the front-rear direction and a head unit 20 attached to the front end of the support rod 10. The head unit 20 comprises a front tool 30, a power transmission mechanism 40, a head housing 34, and a handle 44. The power transmission mechanism 40 is configured to transmit power to the front tool 30. The head housing 34 houses the power transmission mechanism 40 and is rotatably attached to the support rod 10. The handle 44 extends frontward from the head housing 34. The handle 44 is configured to be gripped by the operator when the head housing 34 is rotated with respect to the support rod 10. As shown in FIG. 2, the handle 44 is disposed below a top portion 52b of the head housing 34 in the up-down direction perpendicular to the front-rear direction, in a state where the working machine 2 is placed on a placement surface.

According to the above configuration, in the event of an upper surface side of the head housing 34 colliding against the ground surface due to the working machine 2 being dropped, the top portion 52b of the head housing 34 collides with the ground surface first, thus the handle 44 can be suppressed from colliding with the ground surface. As a result, damage to the handle 44 can be prevented.

As shown in FIG. 2, the handle 44 extends obliquely toward a front lower side from the head housing 34 in the state where the working machine 2 is placed on the placement surface.

In general, application of an impact to the front end 44b of the handle 44 is likely to result in damage to the handle 44, as compared to application of an impact to the base end 44a of the handle 44. In the above configuration, the front end 44b of the handle 44 is located lower than the base end 44a of the handle 44. Due to this, in the event of the upper surface side of the head housing 34 colliding against the ground surface due to the working machine 2 being dropped, the base end 44a of the handle 44 collides with the ground surface before the front end 44b of the handle 44. As a result, damage to the handle 44 can be suppressed even when the handle 44 collides with the ground surface.

As shown in FIG. 2, the handle 44 is located below a line connecting the top portion 52b of the head housing 34 and the front end 30a of the front tool 30 in the state where the working machine 2 is placed on the placement surface.

In the above configuration, in the event of the upper surface side of the head housing 34 colliding against the ground surface due to the working machine 2 being dropped, the top portion 52b of the head housing 34 and the front end 30a of the front tool 30 collide with the ground surface first, thus the handle 44 does not collide with the ground surface. Due to this, damage to the handle 44 can surely be prevented.

As shown in FIG. 2, the length L1 of the handle 44 in the front-rear direction is 25 mm or more.

When rotating the head housing 34 with respect to the support rod 10, the operator grips the handle 44 with his/her hand. According to the above configuration, the operator can grip the handle 44 from right side or left side with his/her multiple fingers.

As shown in FIG. 3, the width W1 of the handle in the left-right direction perpendicular to the front-rear direction and the up-down direction is 20 mm or more.

When rotating the head housing 34 with respect to the support rod 10, the operator grips the handle 44 with his/her hand. According to the above configuration, the operator can stably grip the handle 44 from front side or from above.

As shown in FIG. 2, the head housing 34 comprises the lower head housing 50 supporting the front tool 30 and the upper head housing 52 disposed above the lower head housing 50. The handle 44 extends frontward from the upper head housing 52. The handle 44 is apart by 20 mm or more from the lower head housing 50.

When rotating the head housing 34 with respect to the support rod 10, the operator grips the handle 44 with his/her hand. The above configuration allows the operator to insert his/her finger(s) between the front end 44b of the handle 44 and the lower head housing 50 to grip the handle 44.

A working machine 2 is an electric working machine. The working machine 2 comprises a support rod 10, a head unit 20, and a grip unit 22. The support rod 10 extends in the front-rear direction. The head unit 20 is attached to the front end of the support rod 10 and comprises a front tool 30 and a motor 36 configured to drive the front tool 30. The grip unit 22 is attached to the rear end of the support rod 10. As shown in FIG. 14, the grip unit 22 comprises a grip housing 106, a detection sensor 110, and a presence sensor 116. The grip housing 106 is configured to be gripped by the operator. The detection sensor 110 is attached to the grip housing 106 and is configured to detect an on/off operation for the motor 36 by the operator. The presence sensor 116 is attached to the grip housing 106 and is configured to detect a grip by the operator on the grip housing 106. The support rod 10 does not penetrate through the grip housing 106. As shown in FIG. 16, in the rear plan view of the working machine 2, at least one of the detection sensor 110 and the presence sensor 116 may at least partially overlap the support rod 10.

According to the above configuration, in the rear plan view of the working machine 2, the entirety of the detection sensor 110 and the entirety of the presence sensor 116 both do not have to be disposed outside a region overlapping the support rod 10. Due to this, the configuration can make the grip housing 106 slim, thus it can make the grip unit 22 slim, as compared to a configuration in which the entirety of the detection sensor 110 and the entirety of the presence sensor 116 both do not overlap the support rod 10 in the rear plan view of the working machine 2.

The grip unit 22 further comprises a lever 114. The lever 114 is attached to the grip housing 106 and is configured to be operated by the operator. The presence sensor 116 is configured to detect the grip by the operator on the grip housing 106 when the lever 114 is operated.

In the above configuration, the presence sensor 116 detects the grip by the operator on the grip housing 106 without the operator directly touching the presence sensor 116. Thus, the presence sensor 116 can be disposed at a position within the grip housing 106 that the operator would not directly touch.

The working machine 2 further comprises a control unit 128 disposed rearward of the rear end of the support rod 10 and configured to control actuation of the motor 36. As shown in FIG. 17, in the rear plan view of the working machine 2, the control unit 128 at least partially overlaps the support rod 10.

According to the above configuration, in the rear plan view of the working machine 2, the entirety of the control unit 128 does not have to be disposed outside the region overlapping the support rod 10. Thus, the configuration can reduce the size of the working machine 2 in the direction perpendicular to the front-rear direction, as compared to a configuration in which the entirety of the control unit 128 does not overlap the support rod 10 in the rear plan view of the working machine 2.

The front tool 30 comprises the cutting blades 32 for cutting an object.

In the above configuration, the working machine 2 can be used as one of a mower, a hedge trimmer, and a chain saw.

Second Embodiment

Figure 19:
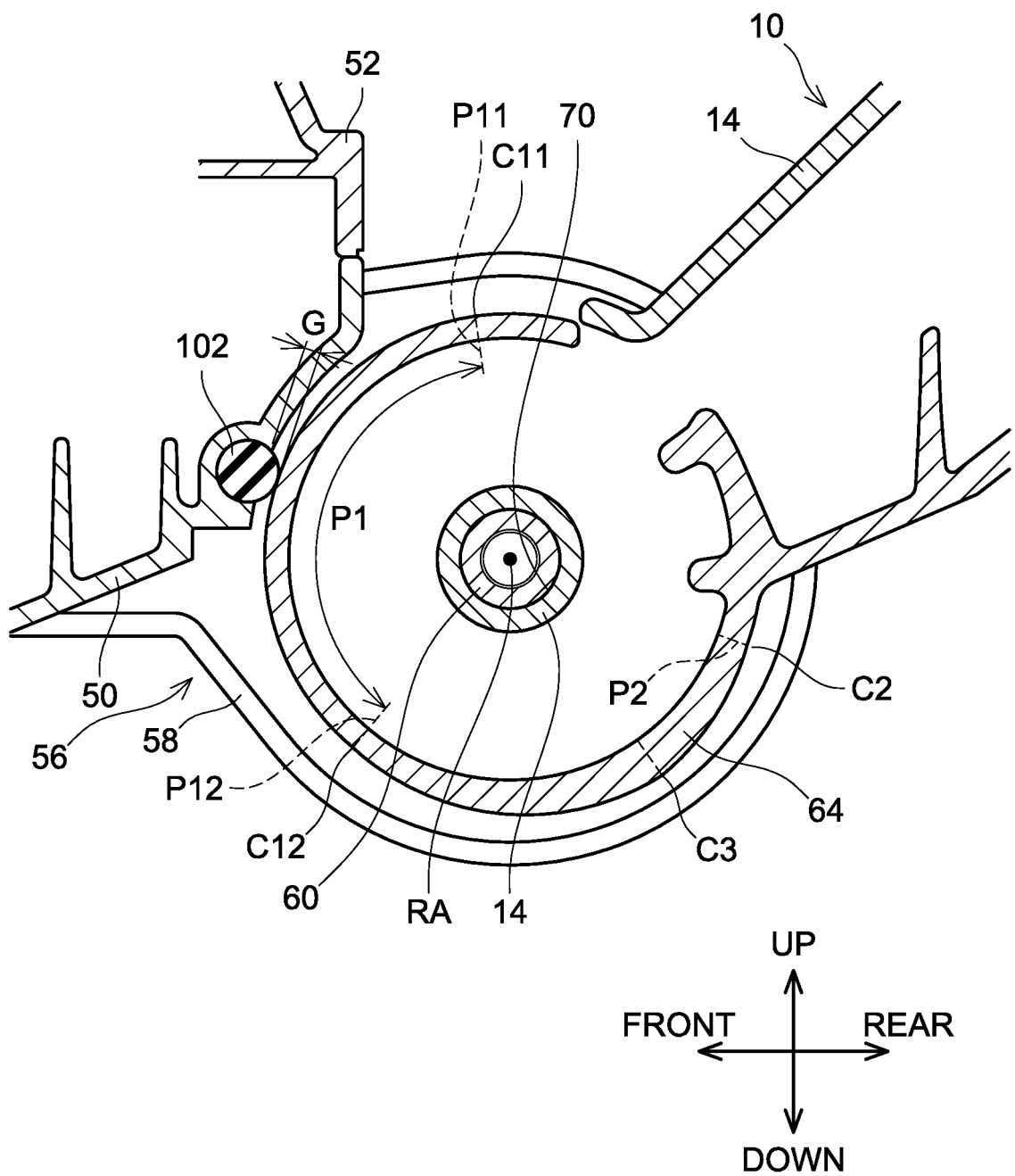
FIG. 19 is a cross-sectional view of an area around a rotation unit 56 of a working machine 2 of a second embodiment, with a shaft 90b of an insertion member 90 inserted in an intermediate opening 78c.

A second embodiment will be described with reference to FIG. 19. For the second embodiment, differences from the first embodiment will be described, and the same features as those of the first embodiment will be denoted with the same reference signs and descriptions thereof will be omitted. In the second embodiment, the distance between the outer circumferential surface of the first portion 64 and the rotation axis RA differs from that of the first embodiment. The distance between the outer circumferential surface of the first portion 64 and the rotation axis RA is constant between the distant position C11 and the proximal position C12. Further, the distance between the outer circumferential surface of the first portion 64 and the rotation axis RA increases from the proximal position C12 toward an intermediate position C3 and then decreases from the intermediate position C3 toward the contacting position C2. The thickness of the first portion 64 is constant between the distant position C11 and the proximal position C12, increases from the proximal position C12 toward the intermediate position C3 and then decreases from the intermediate position C3 toward the contacting position C2.

The gap G between the first portion 64 and the lower head housing 50 becomes smaller from the proximal position C12 toward the intermediate position C3 and then becomes larger from the intermediate position C3 toward the contacting position C2. That is, the gap G decreases and then increases as the head unit 20 moves from the proximal operation position P12 toward the fully-bent position P2 with respect to the support rod 10. Thus, the degree of the deformation of the resistance member 102 increases and then decreases, as the head unit 20 moves from the proximal operation position P12 toward the fully-bent position P2 with respect to the support rod 10. As a result, the resistance force provided by the resistance member 102 increases and then decreases, as the head unit 20 moves from the proximal operation position P12 toward the fully-bent position P2 with respect to the support rod 10.

In the present embodiment, the rotation position of the head unit 20 with respect to the support rod 10 changes between the full-bent position P2 at which the head unit 20 is fully bent toward the support rod 10 and the operation position P12 at which the head unit 20 is opened with respect to the support rod 10. The magnitude of the resistance force decreases after having increased, as the rotation position of the head unit 20 with respect to the support rod 10 shifts from the operation position P12 to the full-bent position P2.

The above configuration makes it difficult for the head unit 20 to rotate with respect to the support rod 10 as the head unit 20 shifts from the operation position P12 toward a vicinity of the fully-bent position P2, while the configuration makes it easier for the head unit 20 to rotate with respect to the support rod 10 in the vicinity of the fully-bent position P2. Thus, the configuration can prevent the sharp bending of the head unit 20 toward the support rod 10 when the head unit 20 rotates from the operation position P12 toward the fully-bent position P2, and also can facilitate the bending of the head unit 20 toward the support rod 10 in the vicinity of the fully-bent position P2.

In one aspect of the working machine 2, the head unit 20 may comprise an attachment portion attached to the support rod 10, and the support rod 10 may comprise a rotation unit configured to rotate with respect to the head unit 20.

In one aspect of the working machine 2, the position fixing mechanism 88 may not fix the rotation position of the support rod 10 with respect to the head unit 20 at the predetermined positions, but may rather be configured to fix the head unit 20 at any positions with respect to the support rod 10.

In one aspect of the working machine 2, the positioning plate 74 may include a plurality of positioning recesses that are depressed from an outer circumferential surface of the positioning plate 74. In this case, the plurality of positioning recesses does not penetrate the positioning plate 74 in the thickness direction.

In one aspect of the working machine 2, the resistance member 102 may be fitted to the first portion 64 of the attachment portion 14 of the support rod 10.

In one aspect of the working machine 2, when the head unit 20 rotates with respect to the support rod 10 from the proximal operation position P12 toward the fully-bent position P2, the gap G may be constant from the proximal operation position P12 to a predetermined position and decrease from the predetermined position toward the fully-bent position P2. In this case, when the head unit 20 rotates with respect to the support rod 10 from the proximal operation position P12 toward the fully-bent position P2, the resistance force may be constant from the proximal operation position P12 to the predetermined position and decrease from the predetermined position toward the fully-bent position P2.

In one aspect of the working machine 2, the handle 44 may extend from the upper front surface 52a of the upper head housing 52 in a direction along the front-rear direction.

In one aspect of the working machine 2, the presence sensor 11.6 may not overlap the support rod 10 and the detection sensor 110 may at least partially overlap the support rod 10 in the rear plan view of the working machine 2.

In one aspect of the working machine 2, both the detection sensor 110 and the presence sensor 116 may at least partially overlap the support rod 10 in the rear plan view of the working machine 2.

In one aspect of the working machine 2, the presence sensor 116 may be a pressure sensor that is configured to detect a pressure applied by the grip of the operator on the grip housing 106 and detect the grip by the operator on the grip housing 106 from the detected pressure. Further, the presence sensor 116 may be an optical detection sensor. In this case, the optical detection sensor may be configured to sense an amount of light reflection or may be configured to sense an amount of light passing through a space. Alternatively, the presence sensor 116 may be a static capacitance sensor disposed on the surface of the grip housing 106.

In one aspect of the working machine 2, the working machine 2 may be a chain saw or a mower.

In one aspect of the working machine 2, the motor 36 may be disposed at the rear end of the support rod 10.

In one aspect of the working machine 2, the working machine 2 may comprise an engine, instead of the motor 36.

In one aspect of the working machine 2, the motor 36 may be a brush motor.

What is claimed is:

1. An electric working machine, comprising:
   a support rod extending in a front-rear direction;
   a head unit attached to a front end of the support rod, the head unit comprising a front tool and a motor configured to drive the front tool; and
   a grip unit attached to a rear end of the support rod, wherein
   the grip unit comprises:
   a grip housing configured to be gripped by an operator;
   a detection sensor attached to the grip housing and configured to detect an on/off operation for the motor by the operator; and
   a presence sensor attached to the grip housing and configured to detect a grip by the operator on the grip housing, the support rod does not penetrate through the grip housing, and in a rear plan view of the electric working machine, at least one of the detection sensor and the presence sensor at least partially overlaps the support rod.

2. The electric working machine according to claim 1, wherein the grip unit further comprises a lever, the lever being attached to the grip housing and configured to be operated by the operator, and the presence sensor is configured to detect the grip by the operator on the grip housing when the lever is operated.

3. The electric, working machine according to claim 1, further comprising:

a control unit disposed rearward of the rear end of the support rod and configured to control actuation of the motor, wherein in the rear plan view of the electric working machine, the control unit at least partially overlaps the support rod.

4. The electric, working machine according to claim 1, wherein the front tool comprises a cutting blade for cutting an object.

\* \* \* \* \*